US011222043B2

(12) United States Patent
Horowitz et al.

(10) Patent No.: US 11,222,043 B2
(45) Date of Patent: Jan. 11, 2022

(54) SYSTEM AND METHOD FOR DETERMINING CONSENSUS WITHIN A DISTRIBUTED DATABASE

(71) Applicant: MongoDB, Inc., New York, NY (US)

(72) Inventors: Eliot Horowitz, New York, NY (US); Andrew Michalski Schwerin, Brooklyn, NY (US); Siyuan Zhou, Jersey City, NJ (US); Eric Andrew Milkie, Stamford, CT (US)

(73) Assignee: MongoDB, Inc., New York, NY (US)

( * ) Notice: Subject to any disclaimer, the term of this patent is extended or adjusted under 35 U.S.C. 154(b) by 310 days.

(21) Appl. No.: 16/456,685

(22) Filed: Jun. 28, 2019

(65) Prior Publication Data

US 2020/0097486 A1 Mar. 26, 2020

Related U.S. Application Data

(63) Continuation of application No. 15/605,426, filed on May 25, 2017, now Pat. No. 10,346,430, which is a continuation-in-part of application No. 15/074,987, filed on Mar. 18, 2016, now Pat. No. 10,621,200, which is a continuation of application No. 14/064,705, filed on Oct. 28, 2013, now Pat. No. 9,317,576, which is a continuation of application No.
(Continued)

(51) Int. Cl.
*G06F 16/27* (2019.01)
*G06F 11/07* (2006.01)
*G06F 11/14* (2006.01)
*G06F 16/23* (2019.01)

(52) U.S. Cl.
CPC ........ *G06F 16/273* (2019.01); *G06F 11/0709* (2013.01); *G06F 11/0793* (2013.01); *G06F 11/1458* (2013.01); *G06F 16/2365* (2019.01); *G06F 2201/84* (2013.01)

(58) Field of Classification Search
CPC ............. G06F 11/0709; G06F 11/0793; G06F 11/1458; G06F 16/2365; G06F 2201/84
See application file for complete search history.

(56) References Cited

U.S. PATENT DOCUMENTS

| 4,918,593 | A | 4/1990 | Huber |
| 5,379,419 | A | 1/1995 | Heffernan et al. |
| 5,416,917 | A | 5/1995 | Adair et al. |

(Continued)

OTHER PUBLICATIONS

[No Author Listed], Automated Administration Tasks (SQL Server Agent). https://docs.microsoft.com/en-us/sql/ssms/agent/automated-adminsitration-tasks-sql-server-agent. 2 pages, [downloaded Mar. 4, 2017].

(Continued)

*Primary Examiner* — Truong V Vo
(74) *Attorney, Agent, or Firm* — Wolf, Greenfield & Sacks, P.C.

(57) ABSTRACT

A system and method for determining consensus within a distributed database are provided. According to one aspect, a protocol is provided that reduces or eliminates heartbeat communication between nodes of a replica set. Nodes may communicate liveness information using existing database commands and metadata associated with the database commands. According to another aspect, improved systems and methods are provided for detection of node failures and election of a new primary node.

20 Claims, 7 Drawing Sheets

Related U.S. Application Data

12/977,563, filed on Dec. 23, 2010, now Pat. No. 8,572,031.

(60) Provisional application No. 62/343,546, filed on May 31, 2016.

(56) References Cited

U.S. PATENT DOCUMENTS

| | | | |
|---|---|---|---|
| 5,471,629 A | 11/1995 | Risch | |
| 5,551,027 A | 8/1996 | Choy et al. | |
| 5,598,559 A | 1/1997 | Chaudhuri | |
| 5,710,915 A | 1/1998 | McElhiney | |
| 5,884,299 A | 3/1999 | Ramesh et al. | |
| 5,999,179 A | 12/1999 | Kekic et al. | |
| 6,065,017 A | 5/2000 | Barker | |
| 6,088,524 A | 7/2000 | Levy et al. | |
| 6,112,201 A | 8/2000 | Wical | |
| 6,115,705 A | 9/2000 | Larson | |
| 6,212,529 B1 | 4/2001 | Boothby et al. | |
| 6,240,406 B1 | 5/2001 | Tannen | |
| 6,240,514 B1 | 5/2001 | Inoue et al. | |
| 6,249,866 B1 | 6/2001 | Brundett et al. | |
| 6,324,540 B1 | 11/2001 | Khanna et al. | |
| 6,324,654 B1 | 11/2001 | Wahl et al. | |
| 6,339,770 B1 | 1/2002 | Leung et al. | |
| 6,351,742 B1 | 2/2002 | Agarwal et al. | |
| 6,363,389 B1 | 3/2002 | Lyle et al. | |
| 6,385,201 B1 | 5/2002 | Iwata | |
| 6,385,604 B1 | 5/2002 | Bakalash et al. | |
| 6,427,230 B1 | 7/2002 | Goiffon et al. | |
| 6,438,538 B1 | 8/2002 | Goldring | |
| 6,496,843 B1 | 12/2002 | Getchius et al. | |
| 6,505,187 B1 | 1/2003 | Shatdal | |
| 6,611,850 B1 | 8/2003 | Shen | |
| 6,687,846 B1 | 2/2004 | Adrangi et al. | |
| 6,691,101 B2 | 2/2004 | MacNicol et al. | |
| 6,801,905 B2 | 10/2004 | Andrei | |
| 6,823,474 B2 | 11/2004 | Kampe et al. | |
| 6,920,460 B1 | 7/2005 | Srinivasan et al. | |
| 6,959,369 B1 | 10/2005 | Ashton et al. | |
| 7,020,649 B2 | 3/2006 | Cochrane et al. | |
| 7,032,089 B1 | 4/2006 | Ranade et al. | |
| 7,082,473 B2 | 7/2006 | Breitbart et al. | |
| 7,177,866 B2 | 2/2007 | Holenstein et al. | |
| 7,181,460 B2 | 2/2007 | Coss et al. | |
| 7,191,299 B1 | 3/2007 | Kekre et al. | |
| 7,246,345 B1 | 7/2007 | Sharma et al. | |
| 7,447,807 B1 | 11/2008 | Merry et al. | |
| 7,467,103 B1 | 12/2008 | Murray et al. | |
| 7,469,253 B2 | 12/2008 | Celis et al. | |
| 7,472,117 B2 | 12/2008 | Dettinger et al. | |
| 7,486,661 B2 | 2/2009 | Van den Boeck et al. | |
| 7,548,928 B1 | 6/2009 | Dean et al. | |
| 7,552,356 B1 | 6/2009 | Waterhouse et al. | |
| 7,558,481 B2 | 7/2009 | Jenkins et al. | |
| 7,567,991 B2 | 7/2009 | Armangau et al. | |
| 7,617,369 B1 | 11/2009 | Bezbaruah et al. | |
| 7,634,459 B1 | 12/2009 | Eshet et al. | |
| 7,647,329 B1 | 1/2010 | Fischman et al. | |
| 7,657,570 B2 | 2/2010 | Wang et al. | |
| 7,657,578 B1 | 2/2010 | Karr et al. | |
| 7,668,801 B1 | 2/2010 | Koudas et al. | |
| 7,761,465 B1 | 7/2010 | Nonaka et al. | |
| 7,957,284 B2 | 6/2011 | Lu et al. | |
| 7,962,458 B2 | 6/2011 | Holenstein et al. | |
| 8,005,804 B2 | 8/2011 | Greer | |
| 8,005,868 B2 | 8/2011 | Saborit et al. | |
| 8,037,059 B2 | 10/2011 | Bestgen et al. | |
| 8,078,825 B2 | 12/2011 | Oreland et al. | |
| 8,082,265 B2 | 12/2011 | Carlson et al. | |
| 8,086,597 B2 | 12/2011 | Balmin et al. | |
| 8,099,572 B1 | 1/2012 | Arora et al. | |
| 8,103,906 B1 | 1/2012 | Alibakhsh et al. | |
| 8,108,443 B2 | 1/2012 | Thusoo | |
| 8,126,848 B2 | 2/2012 | Wagner | |
| 8,170,984 B2 | 5/2012 | Bakalash et al. | |
| 8,185,505 B1 | 5/2012 | Blitzer et al. | |
| 8,260,840 B1 | 9/2012 | Sirota et al. | |
| 8,296,419 B1 | 10/2012 | Khanna et al. | |
| 8,305,999 B2 | 11/2012 | Palanki et al. | |
| 8,321,558 B1 | 11/2012 | Sirota et al. | |
| 8,352,450 B1 | 1/2013 | Mraz et al. | |
| 8,352,463 B2 | 1/2013 | Nayak | |
| 8,363,961 B1 | 1/2013 | Avidan et al. | |
| 8,370,857 B2 | 2/2013 | Kamii et al. | |
| 8,386,463 B2 | 2/2013 | Bestgen et al. | |
| 8,392,482 B1 | 3/2013 | McAlister et al. | |
| 8,539,197 B1 | 9/2013 | Marshall et al. | |
| 8,572,031 B2 | 10/2013 | Merriman et al. | |
| 8,589,382 B2 | 11/2013 | Betawadkar-Norwood | |
| 8,589,574 B1 | 11/2013 | Cormie et al. | |
| 8,615,507 B2 | 12/2013 | Varadarajulu et al. | |
| 8,712,044 B2 | 4/2014 | MacMillan et al. | |
| 8,712,993 B1 | 4/2014 | Ordonez | |
| 8,751,533 B1 | 6/2014 | Dhavale et al. | |
| 8,762,031 B2 | 6/2014 | Wada | |
| 8,843,441 B1 | 9/2014 | Rath et al. | |
| 8,869,256 B2 | 10/2014 | Sample | |
| 8,996,463 B2 | 3/2015 | Merriman et al. | |
| 9,015,431 B2 | 4/2015 | Resch et al. | |
| 9,069,827 B1 | 6/2015 | Rath et al. | |
| 9,116,862 B1 | 8/2015 | Rath et al. | |
| 9,141,814 B1 | 9/2015 | Murray | |
| 9,183,254 B1 | 11/2015 | Cole et al. | |
| 9,262,462 B2 | 2/2016 | Merriman et al. | |
| 9,268,639 B2 | 2/2016 | Leggette et al. | |
| 9,274,902 B1 | 3/2016 | Morley et al. | |
| 9,313,604 B1 | 4/2016 | Holcombe | |
| 9,317,576 B2 | 4/2016 | Merriman et al. | |
| 9,350,633 B2 | 5/2016 | Cudak et al. | |
| 9,350,681 B1 | 5/2016 | Kitagawa et al. | |
| 9,460,008 B1 | 10/2016 | Leshinsky et al. | |
| 9,495,427 B2 | 11/2016 | Abadi et al. | |
| 9,569,481 B1 | 2/2017 | Chandra et al. | |
| 9,628,404 B1 | 4/2017 | Goffinet et al. | |
| 9,660,666 B1 | 5/2017 | Ciarlini et al. | |
| 9,715,433 B2 | 7/2017 | Mu et al. | |
| 9,740,762 B2 | 8/2017 | Horowitz et al. | |
| 9,792,322 B2 | 10/2017 | Merriman et al. | |
| 9,800,685 B2 | 10/2017 | Neerincx et al. | |
| 9,805,108 B2 | 10/2017 | Merriman et al. | |
| 9,881,034 B2 | 1/2018 | Horowitz et al. | |
| 9,959,308 B1 | 5/2018 | Carman et al. | |
| 10,031,931 B2 | 7/2018 | Horowitz et al. | |
| 10,031,956 B2 | 7/2018 | Merriman et al. | |
| 10,262,050 B2 | 4/2019 | Bostic et al. | |
| 10,303,570 B2 | 5/2019 | Nakajima | |
| 10,346,430 B2 | 7/2019 | Horowitz et al. | |
| 10,346,434 B1 | 7/2019 | Morkel et al. | |
| 10,366,100 B2 | 7/2019 | Horowitz et al. | |
| 10,372,926 B1 | 8/2019 | Leshinsky et al. | |
| 10,394,822 B2 | 8/2019 | Stearn | |
| 10,423,626 B2 | 9/2019 | Stearn et al. | |
| 10,430,433 B2 | 10/2019 | Stearn et al. | |
| 10,474,645 B2 | 11/2019 | Freedman et al. | |
| 10,489,357 B2 | 11/2019 | Horowitz et al. | |
| 10,496,669 B2 | 12/2019 | Merriman et al. | |
| 10,614,098 B2 | 4/2020 | Horowitz et al. | |
| 10,621,050 B2 | 4/2020 | Horowitz et al. | |
| 10,621,200 B2 | 4/2020 | Merriman et al. | |
| 10,671,496 B2 | 6/2020 | Horowitz et al. | |
| 10,673,623 B2 | 6/2020 | Horowitz et al. | |
| 10,698,775 B2 | 6/2020 | Horowitz et al. | |
| 10,713,275 B2 | 7/2020 | Merriman et al. | |
| 10,713,280 B2 | 7/2020 | Horowitz et al. | |
| 10,740,353 B2 | 8/2020 | Horowitz et al. | |
| 10,740,355 B2 | 8/2020 | Horowitz et al. | |
| 10,776,220 B2 | 9/2020 | Horowitz et al. | |
| 10,846,305 B2 | 11/2020 | Merriman et al. | |
| 10,846,411 B2 | 11/2020 | Horowitz et al. | |
| 10,866,868 B2 | 12/2020 | Horowitz | |
| 10,872,095 B2 | 12/2020 | Horowitz et al. | |
| 10,977,277 B2 | 4/2021 | Merriman et al. | |
| 10,990,590 B2 | 4/2021 | Merriman et al. | |

(56) References Cited

U.S. PATENT DOCUMENTS

| | | |
|---|---|---|
| 10,997,211 B2 | 5/2021 | Merriman et al. |
| 2001/0021929 A1 | 9/2001 | Lin et al. |
| 2002/0029207 A1 | 3/2002 | Bakalash et al. |
| 2002/0065675 A1 | 5/2002 | Grainger et al. |
| 2002/0065676 A1 | 5/2002 | Grainger et al. |
| 2002/0065677 A1 | 5/2002 | Grainger et al. |
| 2002/0143901 A1 | 10/2002 | Lupo et al. |
| 2002/0147842 A1 | 10/2002 | Breitbart et al. |
| 2002/0018423 A1 | 12/2002 | Mosher, Jr. et al. |
| 2002/0198872 A1 | 12/2002 | MacNicol et al. |
| 2003/0046307 A1 | 3/2003 | Rivette et al. |
| 2003/0212668 A1 | 4/2003 | Hinshaw et al. |
| 2003/0084073 A1 | 5/2003 | Hotti et al. |
| 2003/0088659 A1 | 5/2003 | Susarla et al. |
| 2003/0182427 A1 | 9/2003 | Halpern |
| 2003/0187864 A1 | 10/2003 | McGoveran |
| 2004/0078569 A1 | 4/2004 | Hotti |
| 2004/0133591 A1 | 7/2004 | Holenstein et al. |
| 2004/0168084 A1 | 8/2004 | Owen et al. |
| 2004/0186817 A1 | 9/2004 | Thames et al. |
| 2004/0186826 A1 | 9/2004 | Choi et al. |
| 2004/0205048 A1 | 10/2004 | Pizzo et al. |
| 2004/0220937 A1 | 11/2004 | Bickford et al. |
| 2004/0236743 A1 | 11/2004 | Blaicher et al. |
| 2004/0254919 A1 | 12/2004 | Giuseppini |
| 2005/0027796 A1 | 2/2005 | San Andres et al. |
| 2005/0033756 A1 | 2/2005 | Kottomtharayil et al. |
| 2005/0038833 A1 | 2/2005 | Colrain et al. |
| 2005/0192921 A1 | 9/2005 | Chaudhuri et al. |
| 2005/0234841 A1 | 10/2005 | Miao et al. |
| 2005/0283457 A1 | 12/2005 | Sonkin et al. |
| 2006/0004746 A1 | 1/2006 | Angus et al. |
| 2006/0020586 A1 | 1/2006 | Prompt et al. |
| 2006/0085541 A1 | 4/2006 | Cuomo et al. |
| 2006/0090095 A1 | 4/2006 | Massa et al. |
| 2006/0168154 A1 | 7/2006 | Zhang et al. |
| 2006/0209782 A1 | 9/2006 | Miller et al. |
| 2006/0218123 A1 | 9/2006 | Chowdhuri et al. |
| 2006/0235905 A1 | 10/2006 | Kapur |
| 2006/0287998 A1 | 12/2006 | Folting et al. |
| 2006/0288232 A1 | 12/2006 | Ho et al. |
| 2006/0294129 A1 | 12/2006 | Stanfill et al. |
| 2007/0050436 A1 | 3/2007 | Chen et al. |
| 2007/0061487 A1 | 3/2007 | Moore et al. |
| 2007/0094237 A1 | 4/2007 | Mitchell et al. |
| 2007/0124317 A1 | 5/2007 | Dettinger et al. |
| 2007/0203944 A1 | 8/2007 | Batra et al. |
| 2007/0226640 A1 | 9/2007 | Holbrook et al. |
| 2007/0233746 A1 | 10/2007 | Garbow et al. |
| 2007/0240129 A1 | 10/2007 | Kretzschmar et al. |
| 2008/0002741 A1 | 1/2008 | Maheshwari et al. |
| 2008/0005475 A1 | 1/2008 | Lubbers et al. |
| 2008/0016021 A1 | 1/2008 | Gulbeden et al. |
| 2008/0071755 A1 | 3/2008 | Barsness et al. |
| 2008/0098041 A1 | 4/2008 | Chidambaran et al. |
| 2008/0140971 A1 | 6/2008 | Dankel et al. |
| 2008/0162590 A1 | 7/2008 | Kundu et al. |
| 2008/0288646 A1 | 11/2008 | Hasha et al. |
| 2009/0030986 A1 | 1/2009 | Bates |
| 2009/0055350 A1 | 2/2009 | Branish et al. |
| 2009/0077010 A1 | 3/2009 | Muras et al. |
| 2009/0094318 A1 | 4/2009 | Gladwin et al. |
| 2009/0222474 A1 | 9/2009 | Alpern et al. |
| 2009/0240744 A1 | 9/2009 | Thomson et al. |
| 2009/0271412 A1 | 10/2009 | Lacapra et al. |
| 2010/0011026 A1 | 1/2010 | Saha et al. |
| 2010/0030793 A1 | 2/2010 | Cooper et al. |
| 2010/0030800 A1 | 2/2010 | Brodfuehrer et al. |
| 2010/0049717 A1 | 2/2010 | Ryan et al. |
| 2010/0058010 A1 | 3/2010 | Augenstein et al. |
| 2010/0094851 A1 | 4/2010 | Bent et al. |
| 2010/0106934 A1 | 4/2010 | Calder et al. |
| 2010/0161492 A1 | 6/2010 | Harvey et al. |
| 2010/0198791 A1 | 8/2010 | Wu et al. |
| 2010/0205028 A1 | 8/2010 | Johnson et al. |
| 2010/0223078 A1 | 9/2010 | Willis et al. |
| 2010/0235606 A1 | 9/2010 | Oreland et al. |
| 2010/0250930 A1 | 9/2010 | Csaszar et al. |
| 2010/0257142 A1 | 10/2010 | Murphy et al. |
| 2010/0333111 A1 | 12/2010 | Kothamasu |
| 2010/0333116 A1 | 12/2010 | Prahlad et al. |
| 2011/0022642 A1 | 1/2011 | deMilo et al. |
| 2011/0125704 A1 | 5/2011 | Mordinova et al. |
| 2011/0125766 A1 | 5/2011 | Carozza |
| 2011/0125894 A1 | 5/2011 | Anderson et al. |
| 2011/0138148 A1 | 6/2011 | Friedman et al. |
| 2011/0202792 A1 | 8/2011 | Atzmony |
| 2011/0225122 A1 | 9/2011 | Denuit et al. |
| 2011/0225123 A1 | 9/2011 | D'Souza et al. |
| 2011/0231447 A1 | 9/2011 | Starkey |
| 2011/0246717 A1 | 10/2011 | Kobayashi et al. |
| 2011/0258225 A1 | 10/2011 | Taylor et al. |
| 2011/0258317 A1 | 10/2011 | Sinha et al. |
| 2011/0307338 A1 | 12/2011 | Carlson |
| 2012/0054155 A1 | 3/2012 | Darcy |
| 2012/0076058 A1 | 3/2012 | Padmanabh et al. |
| 2012/0078848 A1 | 3/2012 | Jennas et al. |
| 2012/0079224 A1 | 3/2012 | Clayton et al. |
| 2012/0084414 A1 | 4/2012 | Brock et al. |
| 2012/0084789 A1 | 4/2012 | Iorio |
| 2012/0109892 A1 | 5/2012 | Novik et al. |
| 2012/0109935 A1 | 5/2012 | Meijer |
| 2012/0130973 A1 | 5/2012 | Tamm et al. |
| 2012/0130988 A1 | 5/2012 | Nica et al. |
| 2012/0131278 A1 | 5/2012 | Chang et al. |
| 2012/0136835 A1 | 5/2012 | Kosuru et al. |
| 2012/0138671 A1 | 6/2012 | Gaede et al. |
| 2012/0158655 A1 | 6/2012 | Dove et al. |
| 2012/0158949 A1 | 6/2012 | Lee |
| 2012/0159097 A1 | 6/2012 | Jennas, II et al. |
| 2012/0166390 A1 | 6/2012 | Merriman et al. |
| 2012/0166517 A1 | 6/2012 | Lee et al. |
| 2012/0179833 A1 | 7/2012 | Kenrick et al. |
| 2012/0198200 A1 | 8/2012 | Li et al. |
| 2012/0215740 A1 | 8/2012 | Vaillant et al. |
| 2012/0215763 A1 | 8/2012 | Hughes et al. |
| 2012/0221540 A1 | 8/2012 | Rose et al. |
| 2012/0254175 A1 | 10/2012 | Horowitz et al. |
| 2012/0274664 A1 | 11/2012 | Fagnou |
| 2012/0320914 A1 | 12/2012 | Thyni et al. |
| 2013/0019296 A1 | 1/2013 | Brandenburg |
| 2013/0151477 A1 | 6/2013 | Tsaur et al. |
| 2013/0290249 A1 | 10/2013 | Merriman et al. |
| 2013/0290471 A1 | 10/2013 | Venkatesh |
| 2013/0332484 A1 | 12/2013 | Gajic |
| 2013/0339379 A1 | 12/2013 | Ferrari et al. |
| 2013/0346366 A1 | 12/2013 | Ananthanarayanan et al. |
| 2014/0013334 A1 | 1/2014 | Bisdikian et al. |
| 2014/0032525 A1 | 1/2014 | Merriman et al. |
| 2014/0032579 A1 | 1/2014 | Merriman et al. |
| 2014/0032628 A1 | 1/2014 | Cudak et al. |
| 2014/0074790 A1 | 3/2014 | Berman et al. |
| 2014/0101100 A1 | 4/2014 | Hu et al. |
| 2014/0164831 A1 | 6/2014 | Merriman et al. |
| 2014/0180723 A1 | 6/2014 | Cote et al. |
| 2014/0258343 A1 | 9/2014 | Nikula |
| 2014/0279929 A1 | 9/2014 | Gupta et al. |
| 2014/0280380 A1 | 9/2014 | Jagtap et al. |
| 2015/0012797 A1 | 1/2015 | Leggette et al. |
| 2015/0016300 A1 | 1/2015 | Devireddy et al. |
| 2015/0074041 A1 | 3/2015 | Bhattacharjee et al. |
| 2015/0081766 A1 | 3/2015 | Curtis et al. |
| 2015/0242531 A1 | 8/2015 | Rodniansky |
| 2015/0278295 A1 | 10/2015 | Merriman et al. |
| 2015/0301901 A1 | 10/2015 | Rath et al. |
| 2015/0331755 A1 | 11/2015 | Morgan |
| 2015/0341212 A1 | 11/2015 | Hsiao et al. |
| 2015/0378786 A1 | 12/2015 | Supama et al. |
| 2016/0005423 A1 | 1/2016 | Neppalli et al. |
| 2016/0042008 A1 | 2/2016 | Tripathy et al. |
| 2016/0048345 A1 | 2/2016 | Vijayrao et al. |
| 2016/0110284 A1 | 4/2016 | Athalye et al. |
| 2016/0110414 A1 | 4/2016 | Park et al. |
| 2016/0162354 A1 | 6/2016 | Singhai et al. |

(56) References Cited

U.S. PATENT DOCUMENTS

| | | |
|---|---|---|
| 2016/0162374 A1 | 6/2016 | Mutha et al. |
| 2016/0188377 A1 | 6/2016 | Thimmappa et al. |
| 2016/0203202 A1 | 7/2016 | Merriman et al. |
| 2016/0246861 A1 | 8/2016 | Merriman et al. |
| 2016/0253109 A1 | 9/2016 | Litke et al. |
| 2016/0306709 A1 | 10/2016 | Shaull |
| 2016/0323378 A1 | 11/2016 | Coskun et al. |
| 2016/0364440 A1 | 12/2016 | Lee et al. |
| 2017/0032007 A1 | 2/2017 | Merriman |
| 2017/0032010 A1 | 2/2017 | Merriman |
| 2017/0091327 A1 | 3/2017 | Bostic et al. |
| 2017/0109398 A1 | 4/2017 | Stearn |
| 2017/0109399 A1 | 4/2017 | Stearn et al. |
| 2017/0109421 A1 | 4/2017 | Stearn et al. |
| 2017/0169059 A1 | 6/2017 | Horowitz et al. |
| 2017/0262516 A1 | 9/2017 | Horowitz et al. |
| 2017/0262517 A1 | 9/2017 | Horowitz et al. |
| 2017/0262519 A1 | 9/2017 | Horowitz et al. |
| 2017/0262638 A1 | 9/2017 | Horowitz et al. |
| 2017/0264432 A1 | 9/2017 | Horowitz et al. |
| 2017/0270176 A1 | 9/2017 | Horowitz et al. |
| 2017/0286510 A1 | 10/2017 | Horowitz et al. |
| 2017/0286516 A1 | 10/2017 | Horowitz et al. |
| 2017/0286517 A1 | 10/2017 | Horowitz et al. |
| 2017/0286518 A1 | 10/2017 | Horowitz et al. |
| 2017/0322954 A1 | 11/2017 | Horowitz et al. |
| 2017/0322996 A1 | 11/2017 | Horowitz et al. |
| 2017/0344290 A1 | 11/2017 | Horowitz et al. |
| 2017/0344441 A1 | 11/2017 | Horowitz et al. |
| 2017/0344618 A1 | 11/2017 | Horowitz et al. |
| 2017/0371750 A1 | 12/2017 | Horowitz et al. |
| 2017/0371968 A1 | 12/2017 | Horowitz et al. |
| 2018/0004801 A1 | 1/2018 | Burchall et al. |
| 2018/0004804 A1 | 1/2018 | Merriman et al. |
| 2018/0095852 A1 | 4/2018 | Keremane et al. |
| 2018/0096045 A1 | 4/2018 | Merriman et al. |
| 2018/0165338 A1 | 6/2018 | Kumar et al. |
| 2018/0173745 A1 | 6/2018 | Balasubramanian et al. |
| 2018/0300209 A1 | 10/2018 | Rahut |
| 2018/0300381 A1 | 10/2018 | Horowitz et al. |
| 2018/0300385 A1 | 10/2018 | Merriman et al. |
| 2018/0314750 A1 | 11/2018 | Merriman et al. |
| 2018/0343131 A1 | 11/2018 | George et al. |
| 2018/0365114 A1 | 12/2018 | Horowitz |
| 2019/0102410 A1 | 4/2019 | Horowitz et al. |
| 2019/0303382 A1 | 10/2019 | Bostic et al. |
| 2020/0097486 A1 | 3/2020 | Horowitz et al. |
| 2020/0099392 A1 | 3/2020 | Hecker et al. |
| 2020/0285549 A1 | 9/2020 | Horowitz et al. |
| 2020/0295925 A1 | 9/2020 | Horowitz et al. |
| 2020/0327021 A1 | 10/2020 | Horowitz et al. |
| 2020/0341867 A1 | 10/2020 | Horowitz et al. |
| 2020/0409804 A1 | 12/2020 | Horowitz et al. |

OTHER PUBLICATIONS

Chang et al., Bigtable: a distributed storage system for structured data. OSDI'06: Seventh Symposium on Operating System Design and Implementation, Nov. 2006.
Cooper et al., PNUTS: Yahoo!'s hosted data serving platform. VLDB Endowment. Aug. 2008.
Decandia et al., Dynamo: Amazon's highly available key-value store. SOSP 2007. Oct. 2004.
Nelson et al., Automate MongoDB with MMS. PowerPoint Presentation. Published Jul. 24, 2014. 27 slides. http://www.slideshare.net/mongodb/mms-automation-mongo-db-world.
Ongaro et al., In Search of an Understandable Consensus Algorithm. Proceedings of USENIX ATC '14: 2014 USENIX Annual Technical Conference. Philadelphia, PA. Jun. 19-20, 2014; pp. 305-320.
Poder, Oracle living books. 2009. <http://tech.e2sn.com/oracle/sql/oracle-execution-plan-operation-reference >.
Stirman, Run MongoDB with Confidence using MMS. PowerPoint Presentation. Published Oct. 6, 2014. 34 slides, http://www.slideshare.net/mongodb/mongo-db-boston-run-mongodb-with-mms-20141001.
Van Renesse et al., Chain replication for supporting high throughput and availability. OSDI. 2004: 91-104.
Walsh et al., Xproc: An XML Pipeline Language. May 11, 2011. <https://www.w3.org/TR/xproc/>.
Wikipedia, Dataflow programming. Oct. 2011. <http://en.wikipedia.org/wiki/Dataflow_programming>.
Wikipedia, Pipeline (Unix). Sep. 2011. <http://en.wikipedia.org/wiki/Pipeline (Unix)>.
Wilkins et al., Migrate DB2 applications to a partitioned database. developerWorks, IBM. Apr. 24, 2008, 33 pages.
U.S. Appl. No. 15/074,987, filed Mar. 18, 2016, Merriman.
U.S. Appl. No. 15/654,590, filed Jul. 19, 2017, Horowitz et al.
U.S. Appl. No. 15/706,593, filed Sep. 15, 2017, Merriman et al.
U.S. Appl. No. 15/721,176, filed Sep. 29, 2017, Merriman et al.
U.S. Appl. No. 15/200,975, filed Jul. 1, 2016, Merriman.
U.S. Appl. No. 16/294,227, filed Mar. 6, 2019, Bostic et al.
U.S. Appl. No. 15/605,512, filed May 25, 2017, Horowitz et al.
U.S. Appl. No. 15/605,143, filed May 25, 2017, Horowitz.
U.S. Appl. No. 16/525,447, filed Jul. 29, 2019, Horowitz et al.
U.S. Appl. No. 16/588,739, filed Sep. 30, 2019, Stearn et al.
U.S. Appl. No. 15/604,879, filed May 25, 2017, Horowitz.
U.S. Appl. No. 15/604,856, filed May 25, 2017, Horowitz et al.
U.S. Appl. No. 15/605,141, filed May 25, 2017, Horowitz et al.
U.S. Appl. No. 15/605,276, filed May 25, 2017, Horowitz et al.
U.S. Appl. No. 15/605,372, filed May 25, 2017, Horowitz et al.
U.S. Appl. No. 15/627,502, filed Jun. 20, 2017, Horowitz et al.
U.S. Appl. No. 15/627,672, filed Jun. 20, 2017, Horowitz et al.
U.S. Appl. No. 16/013,345, filed Jun. 20, 2018, Horowitz.
U.S. Appl. No. 15/627,613, filed Jun. 20, 2017, Horowitz et al.
U.S. Appl. No. 15/627,631, filed Jun. 20, 2017, Horowitz et al.
U.S. Appl. No. 15/627,645, filed Jun. 20, 2017, Horowitz et al.
U.S. Appl. No. 15/627,656, filed Jun. 20, 2017, Horowitz et al.
U.S. Appl. No. 16/013,720, filed Jun. 20, 2018, Horowitz et al.
U.S. Appl. No. 16/013,706, filed Jun. 20, 2018, Merriman et al.
U.S. Appl. No. 16/013,725, filed Jun. 20, 2018, Merriman et al.
U.S. Appl. No. 16/890,948, filed Jun. 2, 2020, Merriman et al.
U.S. Appl. No. 16/887,092, filed May 29, 2020, Horowitz et al.
U.S. Appl. No. 17/083,238, filed Oct. 28, 2020, Horowitz et al.
U.S. Appl. No. 16/883,653, filed May 26, 2020, Horowitz et al.
U.S. Appl. No. 16/912,963, filed Jun. 26, 2020, Horowitz et al.
U.S. Appl. No. 16/846,916, filed Apr. 13, 2020, Horowitz et al.
U.S. Appl. No. 17/018,475, filed Sep. 11, 2020, Horowitz et al.

SYSTEM AND METHOD FOR DETERMINING CONSENSUS WITHIN A DISTRIBUTED DATABASE

RELATED APPLICATIONS

This Application is a Continuation of U.S. application Ser. No. 15/605,426, filed May 25, 2017, entitled "SYSTEM AND METHOD FOR DETERMINING CONSENSUS WITHIN A DISTRIBUTED DATABASE", which is a Non-Provisional of Provisional (35 USC 119(e)) of U.S. Application Ser. No. 62/343,546, filed May 31, 2016, entitled "SYSTEM AND METHOD FOR DETERMINING CONSENSUS WITHIN A DISTRIBUTED DATABASE". Application Ser. No. 15/605,426 is a Continuation-in-part of U.S. application Ser. No. 15/074,987, filed Mar. 18, 2016, entitled "METHOD AND APPARATUS FOR MAINTAINING REPLICA SETS", which is a Continuation of U.S. application Ser. No. 14/064,705, filed Oct. 28, 2013, entitled "METHOD AND APPARATUS FOR MAINTAINING REPLICA SETS", which is a Continuation of U.S. application Ser. No. 12/977,563, filed Dec. 23, 2010, entitled "METHOD AND APPARATUS FOR MAINTAINING REPLICA SETS", the entire contents of these applications are incorporated herein by reference in their entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

SUMMARY

Systems exist that attempt to ensure operations are performed consistently across distributed systems. There are many different solutions for determining a consensus across multiple systems, especially when performing operations such as updates to a distributed database. In one such type of system, a primary node keeps an account of journaled operations performed on the database. It is appreciated that there are failures within such systems, and it is preferable to have one or more secondary systems that can take over applying database writes if the primary fails. However, it is appreciated that there are tradeoffs between detecting failures in a timely manner while ensuring there are few failover and rollback scenarios.

According to one aspect, a system and protocol is provided that maximizes write availability in the face of maintenance or failures by reducing failover time, regardless of failover frequency. For example, according to one embodiment, the system may achieve failover time in less than 1.5 seconds on "typical" installations. Further, it may be one objective to detect stale primaries in a more timely manner. Also, it may be beneficial to reduce a likelihood of rollback for write operations with write concern <w:majority. Write concern is generally described as the amount of acknowledgement required due to a write operation to be performed on secondaries. Problems exist when write operations are not performed on a majority of nodes within the network.

According to another aspect, new functionality is provided that improves performance for consensus-based protocols. In one aspect, a protocol is provided that reduces or eliminates heartbeat communication from secondary nodes, as it is appreciated that elections will be held only on failure of a primary, and high-frequency chatting from secondaries is not required. Secondaries connected directly to the primary may use the responsiveness of general database write commands (e.g., a getMore command in the MongoDB database system) that can convey heartbeat information. For instance, in one implementation, adding primary state information to the metadata returned through the getMore command, chained secondaries can be informed when upstream secondaries lose track of the primary.

To communicate the liveness of secondaries to the primary, an existing command may be modified to communicate state information. For example, the existing replSetUpdatePosition command in the MongoDB database system may be used to convey heartbeat information. However, in one implementation, the command may be issued in a no-op form during extended periods of writelessness (e.g., conveying heartbeat information without a useful write to perform). For example, by keeping track of how long it has been since the primary has heard an replSetUpdatePosition (e.g., indirectly) from all secondaries, the primary node can track how many secondaries are still responding and replicating. It is appreciated that this detection is not necessary in the Raft protocol, because there is no consequence if the leader continues to accept writes but does not commit the writes; uncommitted log entries are not acted upon by the followers until they are committed. In a database system such as MongoDB, secondaries are actively applying write ops even before they are committed. Due to this consequence, it may be beneficial to actively step down the primary when the primary loses contact with a majority of nodes in a cluster.

According to one aspect, a computer-implemented method for maintaining consensus in a distributed database system comprising a plurality of nodes is provided. The method comprises establishing a primary node having a primary node role within the distributed database system and the primary node hosting a database, wherein the distributed database system provides one or more responses to database requests from one or more client computer systems, establishing a plurality of secondary nodes having a secondary node role, wherein each secondary node is associated with the primary node and hosts a replica of the database hosted by the primary node, replicating, from the primary node, executed write operations to secondary nodes associated with the primary node, communicating, via a normal database operation, heartbeat information as metadata within a write operation function, and automatically recovering the primary node role in the distributed database system in response to a detected failure of the primary node by an absence of the heartbeat information.

According to one embodiment, the method further comprises communicating the heartbeat information to one or more secondary nodes via chain of secondary nodes. According to another embodiment, the method further comprises identifying, within a message associated with an election, a new term identifier. According to another embodiment, the method further comprises storing the new term identifier in an operation log. According to another embodiment, the method further comprises storing, by one or more of the plurality of secondary nodes, the new term identifier in durable storage. According to another embodiment, the method further comprises prohibiting the plurality of secondary nodes from voting more than a predetermined number of times in an election identified by the new term identifier. According to another embodiment, the method further comprises incrementing a value of the new term identifier for each election attempt when a secondary node transitions to a candidate status. According to another embodiment, the method further comprises communicating, via the normal database operation, a value of a current term identifier to a downstream node. According to another embodiment, the method further comprises determining, by the primary node, a last operation in a operation log of the primary node, and determining that the last operation was written by a majority of replica set members.

According to one embodiment, the method further comprises establishing one of the plurality of secondary nodes as a new primary node having the primary node role, deleting replicated write operations received by the new primary node from the original primary node, and establishing a point of consistency within the database between the new primary node and remaining secondary nodes as a new current state of the database. According to another embodiment, the method further comprises associating the new term identifier with at least one write operation of the operation log. According to another embodiment, the method further comprises preventing replication of a write operation responsive to determining that a term identifier associated with the write operation does not match the new term identifier. According to another embodiment, the method further comprises communicating a message to the remaining secondary nodes announcing that the one of the plurality of secondary nodes is the new primary node.

According to one embodiment, the method further comprises communicating, during the normal database operation, database state information as metadata within the write operation function. According to another embodiment, the method further comprises communicating a no-operation command from the plurality of secondary nodes to the primary node, wherein the no-operation command is a valid command that causes the primary node to perform the valid command as a non-operation and treats the receipt of the no-operation command as a heartbeat signal, and communicating, in a response to the no-op command, database state information as metadata to the plurality of secondary nodes.

According to one aspect, a system for maintaining consensus in a distributed database system comprising a plurality of nodes is provided. The system comprises a replication component configured to: establish a primary node having a primary node role within the distributed database system and the primary node hosting a database, wherein the distributed database system provides one or more responses to one or more database requests from one or more client computer systems, and a plurality of secondary nodes having a secondary node role, wherein each secondary node is associated with the primary node and hosts a replica of the database hosted by the primary node, a replication component configured to: replicate, from the primary node, executed write operations to the plurality of secondary nodes, and communicate, via a normal database operation, heartbeat information to the plurality of secondary nodes as metadata within a write operation function, and a recovery component configured to: automatically recover the primary node role in the distributed database system in response to a detected failure of the primary node by an absence of the heartbeat information.

According to one embodiment, the replication component is further configured to communicate the heartbeat information to one or more secondary nodes via a chain of secondary nodes. According to another embodiment, the replication component is further configured to identify, within a message associated with an election, a new term identifier. According to another embodiment, the replication component is further configured to store the new term identifier in an operation log. According to another embodiment, one or more of the plurality of secondary nodes are configured to store the new term identifier in durable storage. According to another embodiment, the recovery component is further configured to prohibit the plurality of secondary nodes from voting more than a predetermined number of times in an election identified by the new term identifier. According to another embodiment, the recovery component is further configured to increment a value of the new term identifier for each election attempt when a secondary node transitions to a candidate status. According to another embodiment, the replication component is further configured to communicate, via the normal database operation, a value of a current term identifier to a downstream node. According to another embodiment, the replication component is further is configured to: determine a last operation in an operation log of the primary node, and determine that the last operation was written by a majority of replica set members.

According to one embodiment, the recovery component is further configured to: establish one of the plurality of secondary nodes as a new primary node having the primary node role, delete replicated write operations received by the new primary node from the original primary node, and establish a point of consistency within the database between the new primary node and remaining secondary nodes as a new current state of the database. According to another embodiment, the replication component is further configured to associate the new term identifier with at least one write operation of the operation log. According to another embodiment, the replication component is further configured to prevent replication of a write operation responsive to determining that a term identifier associated with the write operation does not match the new term identifier. According to another embodiment, the recovery component is further configured to communicate a message from the one of the plurality of secondary nodes to the remaining secondary nodes announcing that the one of the plurality of secondary nodes is the new primary node.

According to one embodiment, the replication component is further configured to communicate, during the normal database operation, primary state information as metadata within the write operation function. According to another embodiment, the replication component is further configured to: communicate a no-operation command from the plurality of secondary nodes to the primary node, wherein the no-operation command is a valid command that causes the primary node to perform the valid command as a non-operation and treats the receipt of the no-operation command as a heartbeat signal, and communicate, in response to the no-operation command, database state information as metadata to the plurality of secondary nodes.

According to one aspect, a computer-implemented method for maintaining availability in a distributed database system comprising a plurality of nodes is provided. The method comprises establishing a primary node having a primary node role within the distributed database system and the primary node hosting a database, wherein the primary node executes one or more database operations in response to one or more database requests from one or more client computer systems, establishing a plurality of secondary nodes having a secondary node role, wherein each secondary node is associated with the primary node and hosts a replica of the database hosted by the primary node, storing, by the primary node, a log of executed operations, querying, by a secondary node of the plurality of secondary nodes, the primary node for a record of executed operations, replicating, by the secondary node, the executed operations, detecting, by the secondary node, a failure of the primary node to communicate with the secondary node, initiating, by the secondary node, selection of one of the plurality of secondary nodes as a new primary node responsive to the detecting of the failure by the secondary node, detecting, by the primary node, a failure to communicate with a threshold number of the plurality of secondary nodes, and initiating, by the primary node, selection of one of the plurality of secondary nodes as a new primary node responsive to the detecting of the failure by the primary node.

According to one embodiment, the method further comprises setting, for each of at least some nodes of the plurality of nodes, an election timeout associated with the node, wherein the at least some nodes include the secondary node. According to another embodiment, the act of detecting, by the secondary node, the failure of the primary node to communicate with the secondary node comprises determining a failure of the primary node to respond to the querying for a period of time greater than or equal to an election timeout associated with the secondary node. According to another embodiment, the act of setting the election timeout further comprises setting the election timeout to a base timeout value summed with a random offset, wherein the base timeout value is shared by the at least some nodes. According to another embodiment, the act of setting the election timeout further comprises setting the election timeout to a value that is greater than an average time required for a node to query a remote node and less than an average time between failures of a node. According to another embodiment, the method further comprises determining, by the secondary node, a priority of the secondary node, and adjusting, by the secondary node, the election timeout associated with the secondary node according to the priority, wherein a higher priority results in a lower election timeout. According to another embodiment, the method further comprises determining, by the secondary node, that a current election term has not changed for the period of time greater than or equal to the election timeout, and initiating, by the secondary node, selection of one of the plurality of secondary nodes as a new primary node.

According to one embodiment, the method further comprises periodically generating, by each of the plurality of secondary nodes, a no-operation liveness command. According to another embodiment, the method further comprises receiving, by the primary node, an indication of liveness of each of the plurality of secondary nodes according to the liveness command generated by each of the plurality of secondary nodes. According to another embodiment, the act of detecting, by the primary node, the failure to communicate with the threshold number of secondary nodes comprises: calculating, by the primary node, an amount of time that has passed since a last received indication of liveness for each of the plurality of secondary nodes, and determining, by the primary node, that the amount of time exceeds a limit for the threshold number of the plurality of secondary nodes.

According to another embodiment, the method further comprises querying, by at least one chained secondary node of the plurality of secondary nodes, the secondary node for a record of executed operations, wherein the at least one chained secondary node is communicatively linked to the secondary node, and replicating, by the chained secondary node, the executed operations. According to another embodiment, the method further comprises communicating, by the secondary node to the primary node, an indication of liveness of the secondary node and an indication of liveness of one or more secondary nodes chained to the secondary node. According to another embodiment, the method further comprises transmitting, by the primary node to the secondary node responsive to the querying, log entries and metadata, wherein the metadata includes database state information.

According to one aspect, a system for managing replication in a distributed database system comprising a plurality of nodes is provided. The system comprises a primary node having a primary node role within the distributed database system and the primary node hosting a database, wherein the primary node executes one or more database operations in response to one or more database requests from one or more client computer systems, a plurality of secondary nodes having a secondary node role, wherein each of the plurality of secondary nodes is associated with the primary node and hosts a replica of the database of the primary node, wherein the primary node is configured to: store a log of executed operations, detect a failure of the primary node to communicate with a threshold number of the plurality of secondary nodes, and initiate selection of one of the plurality of secondary nodes as a new primary node responsive to the detection of the failure by the primary node, and wherein a secondary node of the plurality of secondary nodes is configured to: query the primary node for a record of executed operations, replicate the executed operations, detect a failure of the primary node to communicate with the secondary node, and initiate selection of one of the plurality of secondary nodes as a new primary node responsive to the detection of the failure by the secondary node.

According to one embodiment, the system further comprises an election component configured to set, for each of at least some nodes of the plurality of nodes, an election timeout associated with the node, wherein the at least some nodes include the secondary node. According to another embodiment, secondary node is further configured to determine a failure of the primary node to respond to the querying for a period of time greater than or equal to the election timeout associated with the secondary node in order to detect the failure of the primary node to communicate with the secondary node.

According to one embodiment, the election component is further configured to set the election timeout to a base timeout value summed with a random offset, wherein the base timeout value is shared by the at least some nodes. According to another embodiment, the election component is further configured to set the election timeout to a value that is greater than an average time required for a node to query a remote node and less than an average time between failures of a node. According to another embodiment, the secondary node is further configured to: determine a priority of the secondary node, and adjust the election timeout associated with the secondary node according to the priority, wherein a higher priority results in a lower election timeout. According to another embodiment, the secondary node is further configured to: determine that a current election term has not changed for the period of time greater than or equal to the election timeout, and initiate selection of one of the plurality of secondary nodes as a new primary node.

According to one embodiment, each of the plurality of secondary nodes is further configured to periodically generate a no-operation liveness command. According to another embodiment, the primary node is further configured to receive an indication of liveness of each of the plurality of secondary nodes according to the liveness command generated by each of the plurality of secondary nodes. According to another embodiment, the primary node is further configured to: calculate an amount of time that has passed since a last received indication of liveness for each of the plurality of secondary nodes, and determine that the amount of time exceeds a limit for the threshold number of the plurality of secondary nodes.

According to one embodiment, the plurality of secondary nodes include at least one chained secondary node, the at least one chained secondary node communicatively linked to an the secondary node and configured to: query the secondary node for a record of executed operations, and replicate the executed operations. According to another embodiment, the secondary node is further configured to communicate, to the primary node, an indication of liveness of the secondary node and an indication of liveness of one or more secondary nodes chained to the secondary node.

According to one embodiment, the primary node is further configured to transmit, to the secondary node responsive to the querying, log entries and metadata, wherein the metadata includes database state information.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
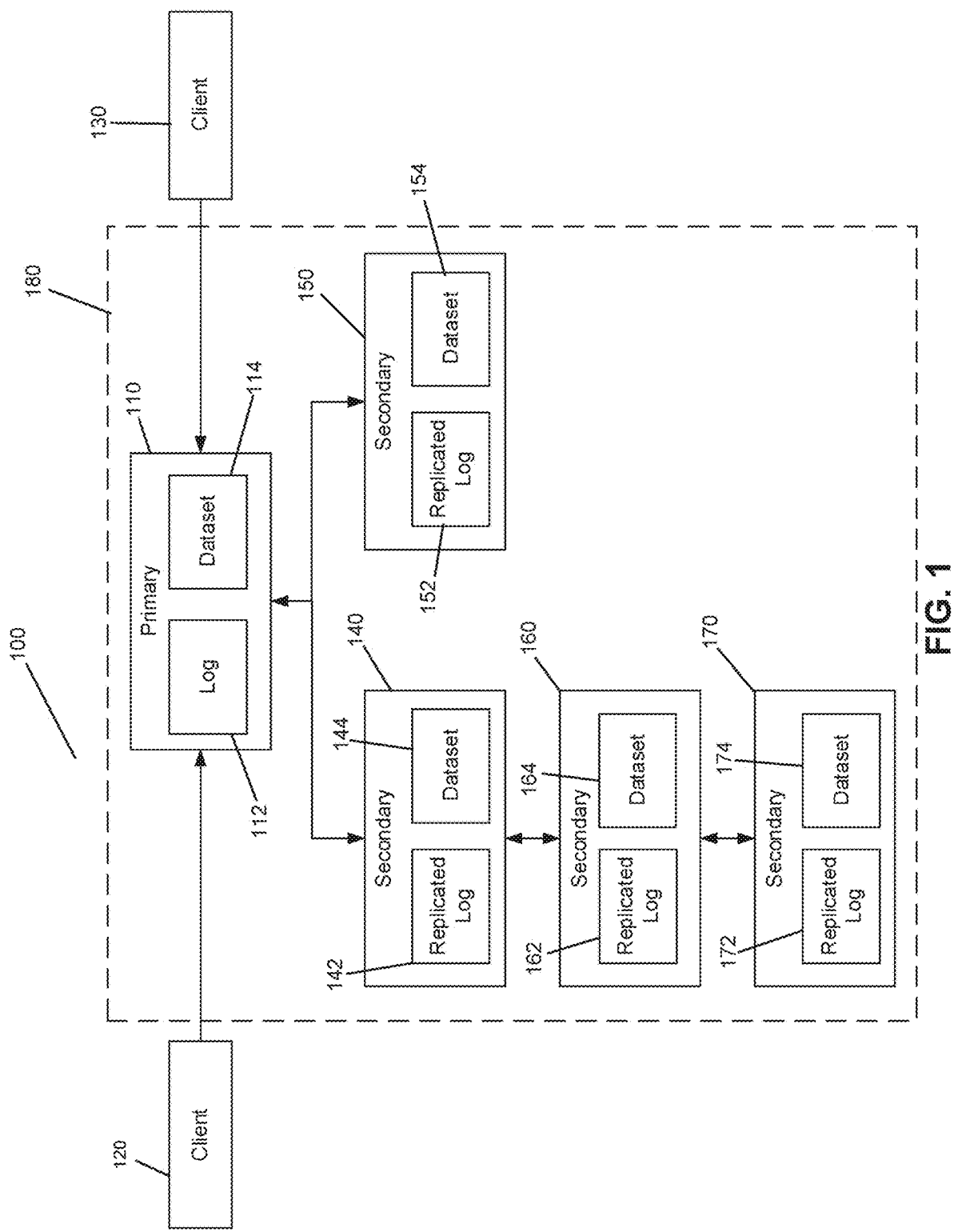
FIG. 1 is a block diagram of an example distributed database system.

Various aspects of at least one example are discussed below with reference to the accompanying figures, which are not intended to be drawn to scale. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

According to one implementation, a system is provided that is capable of processing database requests in a distributed computer system with multiple replicated versions of the database. For instance, it is appreciated that there may be one or more primary database systems and one or more secondary systems that communicate using a clustering protocol to maintain consistency within the distributed database. In one embodiment, a primary or master node is responsible for accepting write operations and propagating them to secondary nodes within the replica set.

An example of such a system is described in more detail in U.S. application Ser. No. 15/074,987 entitled "METHOD AND APPARATUS FOR MAINTAINING REPLICA SETS", incorporated herein by reference, of which the instant application is a continuation-in-part, and the application forms an integral part of the instant application. Aspects of the present invention relate to improvements of the protocol which, for example, may improve performance, reduce rollback situations, etc.

Generally, it is appreciated that there are other methods for determining consensus in distributed systems. One such protocol includes the Raft protocol. It is appreciated that certain aspects of this protocol may be combined with other consensus protocol features to yield performance improvements.

Various embodiments of the present invention relate to improvements in a distributed consensus protocol. In particular, various aspects may relate to improvements to a leader based replicated state machine such as that provided in the MongoDB distributed database system. Consensus is generally defined as getting multiple processes or servers to agree on something. Such a system must handle however a wide range of failure issues, such as, disk failures, network partitions, machine freezes, skews in clocks, or other communication issues.

In some embodiments of a leader based consensus system, the leader includes the state machine and a replicated log which is distributed to one or more secondary systems. It is appreciated that issues exist when the primary is lost and failover occurs. Operationally, is beneficial to have the system be available for as much time as possible, as in one leader-based system, the primary node applies writes to the system, and it is beneficial to have the primary available as much as possible, and therefore reduce the amount of time for establishing a new primary. According to one embodiment, term IDs may be used to identify the attempts of an election of a new primary. In one implementation, the term may be a monotonically increasing identifier of the unique term in which an election occurs. For example, by using an election ID, voters may distinguish elections so that they can vote more quickly in different elections. Other aspects that improve performance may be used relate to being able to more quickly detect false primaries, increasing heartbeat frequency, including a configurable election timeout that is randomized per node, and using chained replication. Such improvements may reduce the amount of time to detect failover conditions, reducing rollback, and performing failover more quickly.

According to another embodiment, unlike in the Raft protocol, where followers have operations pushed to them by the leader, in MongoDB, secondaries pull records of executed operations (e.g., oplog entries) from the leader. Because of this, according to one implementation, the winning candidate of an election must broadcast a final message indicating that the winning candidate is the new leader. This message can take the form of a new declare winner command (e.g., a replSetDeclareElectionWinner command).

In some embodiments, the replica set system associated with the MongoDB database provides configurable levels of data readability and writability in the event of zero or more node failures. In some embodiments, the MongoDB database achieves the configurability of levels by assembling 'mongod' nodes into replica sets, which coordinate the acceptance and distribution of logical write operations. In one implementation, in order to maintain MongoDB database consistency guarantees, members of a replica set elect a primary node to coordinate writes. Clients direct writes to such a primary node, which then takes responsibility for ensuring the ordering guarantees and replicates the writes to secondaries in a way that preserves those guarantees on secondary nodes.

Definitions

In one implementation, when a primary node fails or is removed for maintenance, the other members of the set attempt to select a new primary node by conducting one or more elections. During the period between the primary node failure and the subsequent successful election of another node, no writes are accepted by the system. The write availability of the system for some client is the percentage of wall clock time that the replica set is capable of accepting writes from that client.

Failover time is the amount of wall clock time starting when a set becomes unavailable for writes until the set is again available for writes. Failover time may be markedly different for different failure modes.

Stale primaries are nodes that were once primary but then became partitioned from the majority of the members of the set (with a newly elected primary as one of the members of such a majority). They have yet to notice a new primary was elected, and have yet to realize that they cannot satisfy w:majority writes.

Rollback occurs when a primary applies writes that are not successfully replicated to a majority of nodes in the cluster. After a primary steps down or crashes, the former primary, and possibly other nodes, subsequently may discover operations that need to be rolled back. The rollback procedure determines which operations need to be rolled back and removes their effects from the data and the oplog.

Read-committed refers to a restriction on read operations to only return data that reflect write operations that have been deemed committed (observed to be present on a majority of nodes).

According to various embodiments, the system may achieve one or more of the following goals:

Maximize write availability in the face of maintenance or failures by reducing failover time, regardless of failover frequency.

Achieve failover time in less than 1.5 seconds on "typical" installations.

Faster detection of stale primaries.

Reduce likelihood of rollback for write operations with write concern <w:majority.

Supply required machinery for read-committed read concern support on the server.

Provable distributed system algorithm properties:

Committedness of writes.

Expected failover time.

Continue to support a notion of node priorities for elections.

The replication protocol of the MongoDB system predates the Raft replication protocol, which provides a basic analysis of how long a secondary ("follower") must wait before deciding that the primary ("leader") is dead and calling for an election, in terms of the time it takes for the primary to broadcast a message to all secondaries. If the secondary's waiting time is too short, the secondary system will call for unnecessary elections, possibly reducing write availability. If the waiting time is too long, dead primaries will not be replaced expediently. The Raft analysis suggests that the election timeout should be large enough that it is very unlikely that an election commences due to a delayed Raft heartbeat message. For network latency distributions observed in the Raft paper, an election timeout that is an order of magnitude larger than the broadcast latency suffices.

It is appreciated that aspects of the protocols can be combined to improve performance. In particular, it is appreciated that in some embodiments the use of monotonically increasing term ids to identify elections, and that an existing command may be used as a high-frequency heartbeat of the primary, and the use of a pseudo random number generator (PRNG) to select the election timeout on secondaries. Embodiments described herein may leverage the Raft correctness proofs and performance analyses.

FIG. 1 shows a block diagram of a distributed database system 100 capable of implementing various aspects of embodiments described herein. In particular, distributed database system 100 includes client systems 120, 130 and a replica set 180 comprising a primary node 110, two secondary nodes 140, 150 in direct communication with the primary node 110, and two secondary nodes 160, 170 chained from secondary node 140. The replica set 180 may host a distributed database.

In some embodiments, the primary node 110 may receive database operation requests from a plurality of client systems (e.g. clients 120, 130). The primary node 110 may execute operations in response to the requests. In one embodiment, the primary node 110 receives requests to write data to the distributed database that is hosted by the replica set 180. The primary node 110 may respond to the requests by executing the requested operation and writing data to a dataset 114. In one embodiment, the data set maintained by the primary node may represent the current state of the database hosted by the replica set. For example, in replica set 180 the data set 114 may represent the current state of the database hosted by replica set 180.

In one embodiment, the primary node 110 may further maintain a record of operations such as an operation log 112. For example, the primary node 110 may record all executed operations in the log 112. The log 112 may include a plurality of entries each of which specifies a particular executed operation. In some embodiments, an entry may include information about an associated operation. The information may include information that captures the executed operation and metadata associated the operation. In one example, the entry may include an election term ID and a timestamp associated with the operation as well as other information about the operation.

In some embodiments, the secondary nodes of replica set 180 may replicate operations executed by the primary node 110. Secondary nodes 140, 150, 160, and 170 may, for example, execute the same operations executed by primary node 110 on respective datasets 144, 154, 164, and 174. The respective data sets may represent replicas of the dataset 114 managed by the primary node 110. In some embodiments, the dataset 114 may represent the state of the database hosted by the replica set 180 and datasets 144, 154, 164, and 174 may be redundant sets of the dataset 114.

In some embodiments, the secondary nodes 140, 150 may receive a record of executed operations from the primary node 110. In some example embodiments, the secondary nodes 140, 150 may query the primary node 110 for the latest entries in log 112. The secondary nodes 140, 150 may communicate query commands (e.g. getMore, find, etc.) to the primary node 110 to retrieve the latest entries in log 112. The secondary nodes 140, 150 may, in response to the query, receive a set of log entries. The log entries may include information needed to execute associated operations and further include metadata (e.g. time, election term, etc.) about the operations. The secondary nodes 140, 150 may then replicate operations specified in the received entries according. The secondary nodes 140, 150 may, for example, use the information in the log entries to carry out the recorded operations. In some embodiments, the secondary nodes 140, 150 may maintain records of executed operations such as respective logs 142 and 152. The logs 142 and 152 may include records of operations executed by secondary nodes 140 and 150 respectively.

In some embodiments, the replica set 180 may use query responses as a heartbeat to detect health of communication between a primary node and secondary node. In one embodiment, a secondary node may determine a time between communication of a query command to the primary node and receipt of a response to the query. In one implementation, if the secondary node determines that the time exceeds a particular value (e.g. a timeout), the system may detect a failure of the primary node. In some embodiments, the secondary node may trigger selection of a new primary node responsive to detecting failure of the primary node.

In some embodiments, all secondary nodes of replica set 180 may not be in direct communication with primary node 110. For example, secondary nodes 160 and 170 are not in direct communication with primary node 110 in replica set 180. Secondary node 160 is chained to and in direct communication with secondary node 140 while secondary node 170 is chained to and in direct communication with secondary node 160. In one implementation, in order to update and maintain replica datasets 164 and 174 managed by secondary nodes 160 and 170 respectively, the secondary nodes 160, 170 may receive a record of operations from the secondary nodes to which they are chained. For example, secondary node 160 may query secondary node 140 for a record of latest operations. The secondary node 160 may receive, in response to the query, one or more log entries of executed operations. The log entries may comprise information to execute associated operations and metadata associated with the operations. The secondary node 160 may then execute the received operations recorded in the received log entries. In some embodiments, the secondary node 160 may also maintain a log 162 of executed operations.

Similar to how secondary node 160 interacts with secondary node 140 to update dataset 164 associated with secondary node 160, in one implementation, secondary node 170 may interact with secondary node 160 to update the associated dataset 174. The secondary node 170 may query secondary node 160 for a record of operations. The secondary node 170 may receive, in response to the query, a set of log entries specifying operations. The secondary node 170 may use information in the log entry to replicate the operation on dataset 174. The secondary node 170 may further maintain a log 172 of executed operations.

In some embodiments, the secondary nodes may query and replicate operations executed by the primary node 110 asynchronously. According to one aspect, a secondary node may eventually become consistent with a primary node. For example, secondary nodes 140, 150, 160, 170 have respective data sets 144, 154, 164, 174 that are eventually consistent with data set 114 managed by primary node 110.

In some embodiments, the chained secondary nodes 160, 170 that are not in direct communication with the primary node 110 may use metadata to determine a health of the primary node 110. In one example embodiment, the chained secondaries 160, 170 may use metadata included with received operation log entries to determine whether an upstream secondary node has healthy communication with the primary node. For example, secondary node 160 may use time stamp information included with the received operation log entries from secondary node 140 to determine an amount of time that secondary node 140 has not communicated successfully with the primary node 110.

In some embodiments, the secondary nodes of replica set 180 may communicate with primary node 110 to indicate health or liveness of the secondary nodes. In one example embodiment, the secondary nodes issue a liveness command (e.g. a replSetUpdatePosition command). According to one implementation, such a command may comprise a no-operation (no-op) database command that relays heartbeat information. A no-operation database command may comprise a version of a normal database command that does not perform any operations on the database (e.g. write no-op command). The primary node 110 may utilize receipt of liveness commands to determine whether the secondary nodes are healthy and/or whether the primary node 110 is in communication with the secondary nodes. For example, secondary nodes 140 and 150 may communicate liveness commands to primary node 110. The primary node 110 may track time between received liveness commands from each secondary node. If the time exceeds a threshold, the primary node 110 may determine the secondary node to be failed or detect an inability to communicate with the secondary node.

In some embodiments, chained secondary nodes that are not in direct communication with the primary node may issue liveness commands (e.g. a replSetUpdatePosition command) to secondary nodes to which they are chained. The upstream secondary nodes may then include the liveness command or information indicating liveness of downstream secondary nodes in communications to the primary node 110. For example, secondary node 140 may include information indicating liveness of downstream nodes 160 and 170 in liveness command communications sent to primary node 110. The secondary node 140, may, for example receive a liveness command communication from secondary node 160 and determine that secondary node 160 is alive at a time indicated by a time stamp received with the command. The secondary node 140 may include the liveness time in its liveness communication to primary node 140. The secondary node 140 may further include a liveness time of secondary node 170 received via secondary node 160 in a communication to primary node 110.

Example Implementation—Summary

Although some of the examples below refer to use with the MongoDB database system, it should be appreciated that other database systems may be used. Some of the possible changes, alone or in combination with other changes, may be implemented:

Replace tailing oplog query via find and getMore with new find and getMore commands that return extra replication state data along with oplog entries.

Use getMore and replSetUpdatePosition commands to convey liveness heartbeat information to and from primaries. It is appreciated that elections only need to be held if the primary disappears, so a high frequency heartbeat among secondaries is not necessary for this purpose.

Add a 64-bit term counter to oplog entries.

Use a better liveness timeout to decide when to call for elections on secondaries.

Currently, in one example implementation, only the wait-after-election-tie timer is randomized in the code; it is appreciated that this is sub-optimal Use replSetHeartbeat command for establishing ping times and other information needed for building the spanning tree.

Add a new config restriction: Only nodes with votes >0 may have priority >0, excluding arbiters.

Instead of prohibiting such nodes, use the election rules for arbiters.

Nodes record the term and the ballot (the node being voted for) durably, before voting in an election.

In some embodiments, primary nodes determine liveness of secondary nodes by way of database commands. Further, secondary nodes may determine liveness of primary nodes via database commands. Nodes may use receipt of particular commands as heartbeats and indicators of health. In one embodiment, a secondary node may use a command for querying the primary node for log entries to also determine health of the primary node. Additionally, a primary node may receive database commands from secondary nodes and use them as indications of health of communication with the secondary nodes.

In one implementation, liveness may be communicated via database commands (e.g., getMore and replSetUpdatePosition commands). In one example, the system uses periodic heartbeats from each node in the set to every other node to give each node a reasonably symmetric portrait of the liveness of their fellow nodes. This makes the number of heartbeat messages required in a stable system grow as the square of the number of nodes in the replica set, and puts an effective lower bound on the frequency of those heartbeat operations. Because heartbeat frequency may put a lower bound on failover detection and recovery, it would be desired to make the effective heartbeat rate much higher. Fortunately, the nodes' requirements for liveness information are not symmetric.

In some embodiments, primaries need to know if the majority of the set can still receive updates, while secondaries need to know if the primary is still alive. In one implementation, these two pieces of information can be routed via the spanning tree currently used to deliver oplog entries from the primary to the secondaries. Information may be passed among systems in a chainlike manner when they are not directly connected.

In some embodiments, a replica set may use heartbeats in addition to database commands to determine health of nodes and node communication. In one embodiment, the system may use a low frequency heartbeat to reduce latency requirements of the system.

In some embodiments, heartbeats can continue to be used to help choose a sync source (via the ping information), and, if the election timeout is long enough, as a backstop when oplog queries respond too slowly. These heartbeats may not need to be as frequent as some implementations, and certainly do not need to be more frequent. However, when the spanning tree is severed (i.e., when a non-primary node has no sync source), it is appreciated that the heartbeat frequency will need to be higher than the electionTimeout, to prevent a primary from stepping down.

In some embodiments, in order to communicate liveness of the primary to secondaries, database commands such as find and getMore commands can be used to respond promptly to secondaries. The definition of "promptly" depends on the election timeout, which in turn depends on the latency of the network, but may be, for example, under 100 ms for a local network and under 1000 ms for a multi-datacenter system.

In some embodiments, secondaries connected directly to the primary may use the responsiveness of getMore as a stand-in for a heartbeat. Furthermore, by adding primary state information to the metadata returned through the getMore command, chained secondaries can be informed when upstream secondaries lose track of the primary.

In some embodiments, to communicate the liveness of secondaries to the primary, a liveness command (e.g., a replSetUpdatePosition command) may be used to communicate liveness, though that command can be issued in a no-op form during extended periods of writelessness (e.g., an actual write is not performed). By keeping track of how long it has been since the primary has heard a liveness command (possibly indirectly) from all secondaries, the primary can track how many secondaries are still responding and replicating. Note that this detection is not necessary in Raft, because there is no consequence if the leader continues to accept writes but not commit them; uncommitted log entries are not acted upon by the followers until they are committed. In some embodiments of the MongoDB system, secondaries are actively applying write ops even before they are committed. Due to this consequence, we must actively step down the primary when the primary loses contact with a majority of nodes in a cluster. This approach to heartbeating has the advantage that it uses the same channel and direction of communication that is needed to actually propagate operation changes. In one implementation, in the event that there is an asymmetric network partition that temporarily constrains the direction in which connections may be established (i.e., a firewall misconfiguration), these liveness heartbeats flow along secondary-initiated connections, just like oplog operations.

Arbiter Considerations

In some embodiments, additional node types can be employed in addition to primary and secondary nodes. In one example, a node can additionally or alternatively function as an arbiter. A node assigned an arbiter role can be configured to facilitate the election protocol and improve efficiency during election of a new primary node. In one embodiment, an arbiter node may be configured with voting rights in an election protocol but may be unable to take on a primary node role. In some embodiments, an arbiter node receives information on statuses of other nodes and facilitates reaching consensus by accumulating status information and communicating information associated with the most suitable candidates.

In some embodiments, arbiter nodes may execute a database command (e.g. a replSetUpdatePosition command) to receive information on statuses of other nodes. The information may, for example, be included as metadata received in response to the database command. The arbiter node may then use the information in a voting process to participate in electing a new primary node. In one implementation, arbiters must have knowledge of the commit level (e.g., commitIndex or commitLevel parameters) on the current primary in order to vote for nodes in elections. Arbiter nodes may base their vote, at least in part, on a value of the commitIndex or commitLevel.

- Naively, the commitIndex level may be monitored on the primary. In one implementation, a system does not vote 'yea' in response to any candidate whose last log index is behind the commitIndex entry (or the terms do not match).
- Like a secondary, an arbiter chooses a syncSource, and replSetUpdatePositions are sent back to that syncSource; thus a direct connection to the primary is not necessary
- replSetUpdatePosition would indicate a position of a secondary in replication (e.g. an optime). For example, replSetUpdatePosition may indicate a position is OpTime(0,0)
- commitLevel would be fetched via this same command (in its response).

Figure 2:
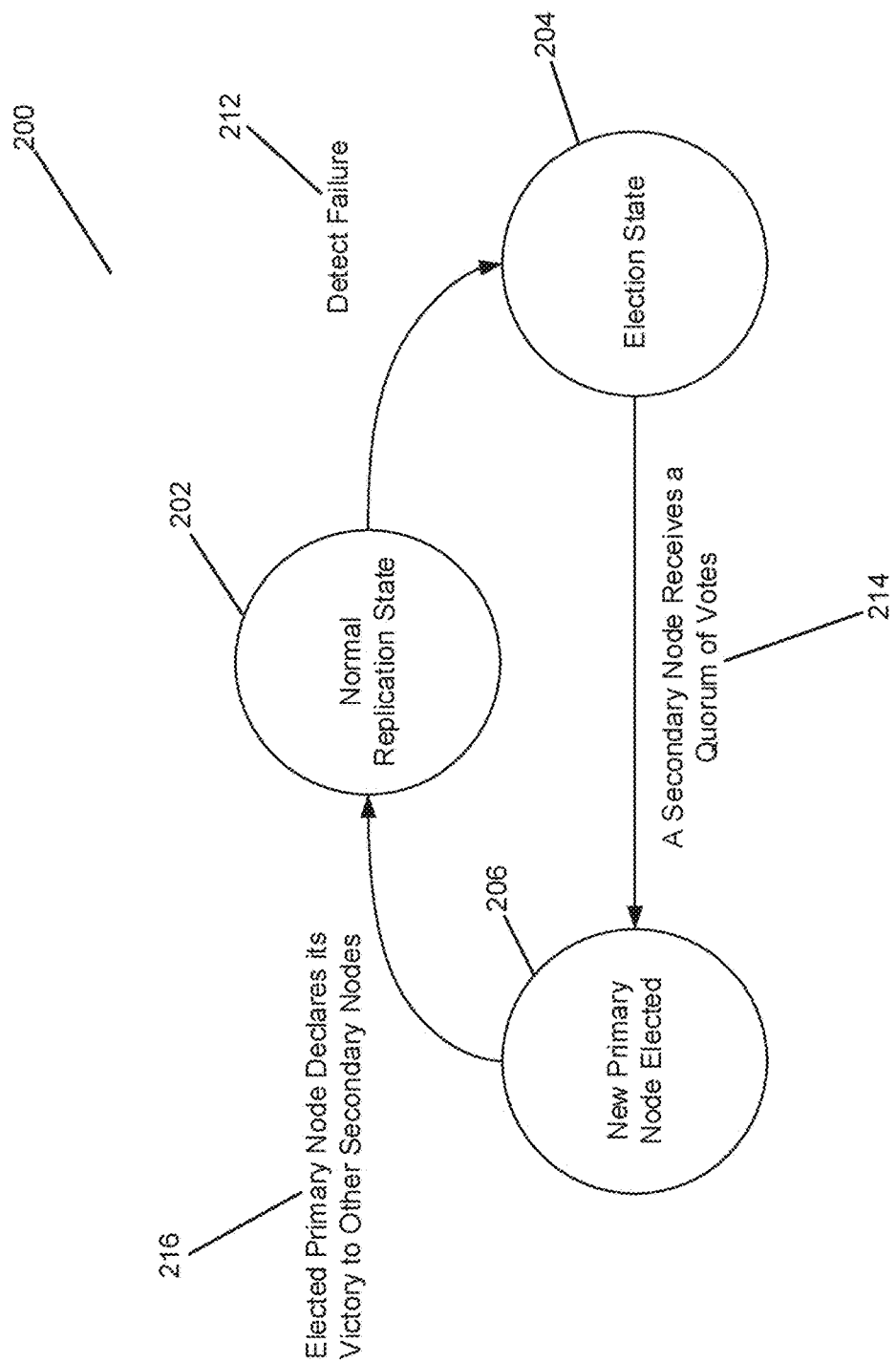
FIG. 2 is a state diagram illustrating an example process for electing a new primary node.

FIG. 2 shows an exemplary state diagram that illustrates an election process according to some embodiments. The illustrated process may, for example, be executed by replica set 180 discussed above with respect to FIG. 1.

At state 202, the system may be in a normal replication state. In some embodiments, a primary node may be receiving database operation requests from clients, executing the operations on a dataset, and logging the operations. A plurality of secondary nodes may query the primary node for log entries and replicate the operations according to received log entries to maintain a replicate of the dataset of the primary node. In some embodiments, one or more secondary nodes may be chained to a secondary node and may query the secondary node for log entries and replicate operations accordingly.

While in the normal replication state 202, the system may detect a primary node failure 212. In one embodiment, a primary node may detect an inability to communicate with a threshold number (e.g. a majority) of secondary nodes. For example, the primary node may determine that the primary node has not received a liveness indication from the threshold number of secondary nodes for a time period. As discussed above, this liveness indication may be communicated in a no-op form of a normal database command sent from secondary nodes to primary nodes. Responsive to the determination, the primary node may trigger an election. In another embodiment, a secondary node may detect an inability to communicate with a primary node. For example, the secondary node may detect that the secondary node has not received a response to a query for new log entries from the primary node for a period of time. In some embodiments, the secondary node may have an election timeout that triggers an election of a new primary node if a query response is not received for a period of time greater than or equal to the election timeout. In some embodiments, each node may have an associated election timeout.

Upon detection of a primary node failure 212, the system may transition to an election state 204. During the election state 204, the nodes of a replica set may participate in an election to select a secondary node to become the new primary node. In one embodiment, a secondary node wins the election by obtaining a quorum of votes. Examples of voting processes are described in more detail in U.S. application Ser. No. 15/074,987 entitled "METHOD AND APPARATUS FOR MAINTAINING REPLICA SETS".

Upon a secondary node receiving a quorum of votes 214, the system may transition to state 206 where a new primary node has been elected. In some embodiments, other nodes in the replica set must be informed of an identity of the new primary node in order to communicate with it. The other nodes may, for example, need to query the new primary node for operation log entries and/or communicate liveness information to the new primary node. In order for a new primary node to allow other nodes to recognize the node as the new primary node, the node must declare its victory to other secondary nodes 216. The node may, for example, issue a command (e.g. a replSetDeclareElectionWinner command) to all other nodes in a replica set informing the other nodes of the change. The system may then return to the normal replication state 202.

Figure 3:
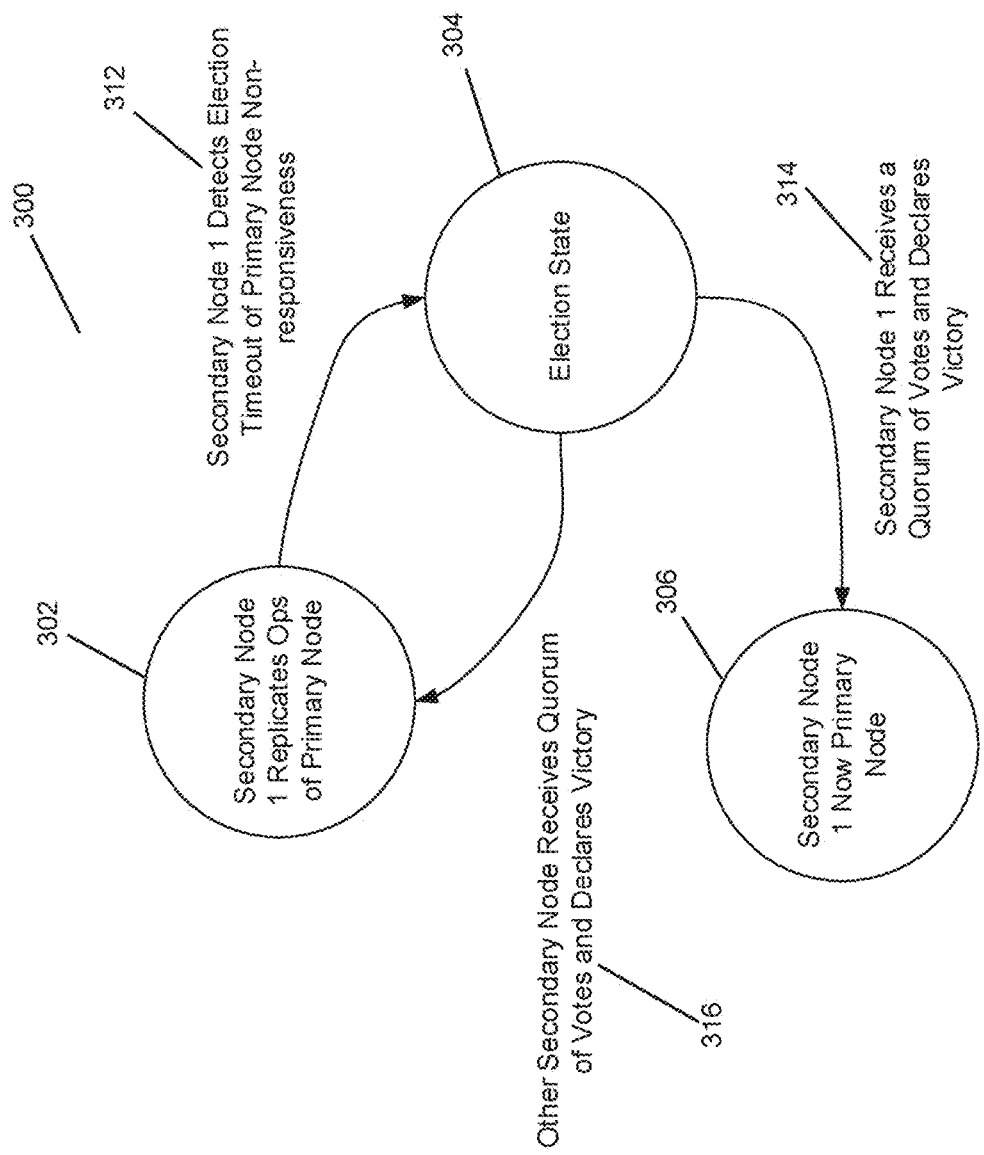
FIG. 3 is a state diagram illustrating an example process by which a secondary node may trigger selection of a new primary node.

FIG. 3 illustrates an exemplary state diagram for an election triggered by a secondary node. One or more secondary nodes of a replica set (e.g. replica set 180) may be configured to participate in the exemplary process.

At state 302, a secondary node of a replica set may be in a normal replication state. In some embodiments, the secondary node queries a primary node for a record of executed database operations. The secondary node may receive, for example, a record such as log entries that specify executed operations and include associated metadata. The secondary node may replicate the operations specified in the log entries to maintain a replica set of a dataset maintained by the primary node.

In some embodiments, the secondary node may communicate query commands to the primary node (e.g. getMore and/or find commands) to receive log entries. The secondary node may utilize responsiveness of the primary node to the query command as a heartbeat. For example, the secondary node may determine an amount of time between communication of a query command and receipt of a response. A secondary node may have an election timeout that triggers an election if the amount of time exceeds a particular threshold.

If the secondary node detects an election timeout 312, the secondary node may transition the replica set into an election state 304. For example, if an amount of time between communication of the query command and a receipt exceeds a threshold time of the election timeout, the secondary node may determine that the primary node has had a failure.

At state 304, nodes of the replica set may participate in an election process to elect a secondary node to become the new primary node. In some embodiments, a secondary node may receive a quorum of votes and declare a victory. If the secondary node that detected the failure receives the quorum of votes and declares its victory 314, the secondary node becomes the primary node. The node may then receive database operation requests from client systems and execute operations accordingly. The node may further log executed operations and provide them to other nodes for replication.

If during the election 304 a different secondary node from the one that determined the failure receives a quorum of votes and declares victory to the other nodes 316, the secondary node may recognize that node as the new primary node. For example, the secondary node may receive a communication (e.g. a replSetDeclareElectionWinner command) from the elected node indicating its role as the new primary role. The secondary node may then return to state 302 and replicate operations from the newly elected primary node.

Figure 4:
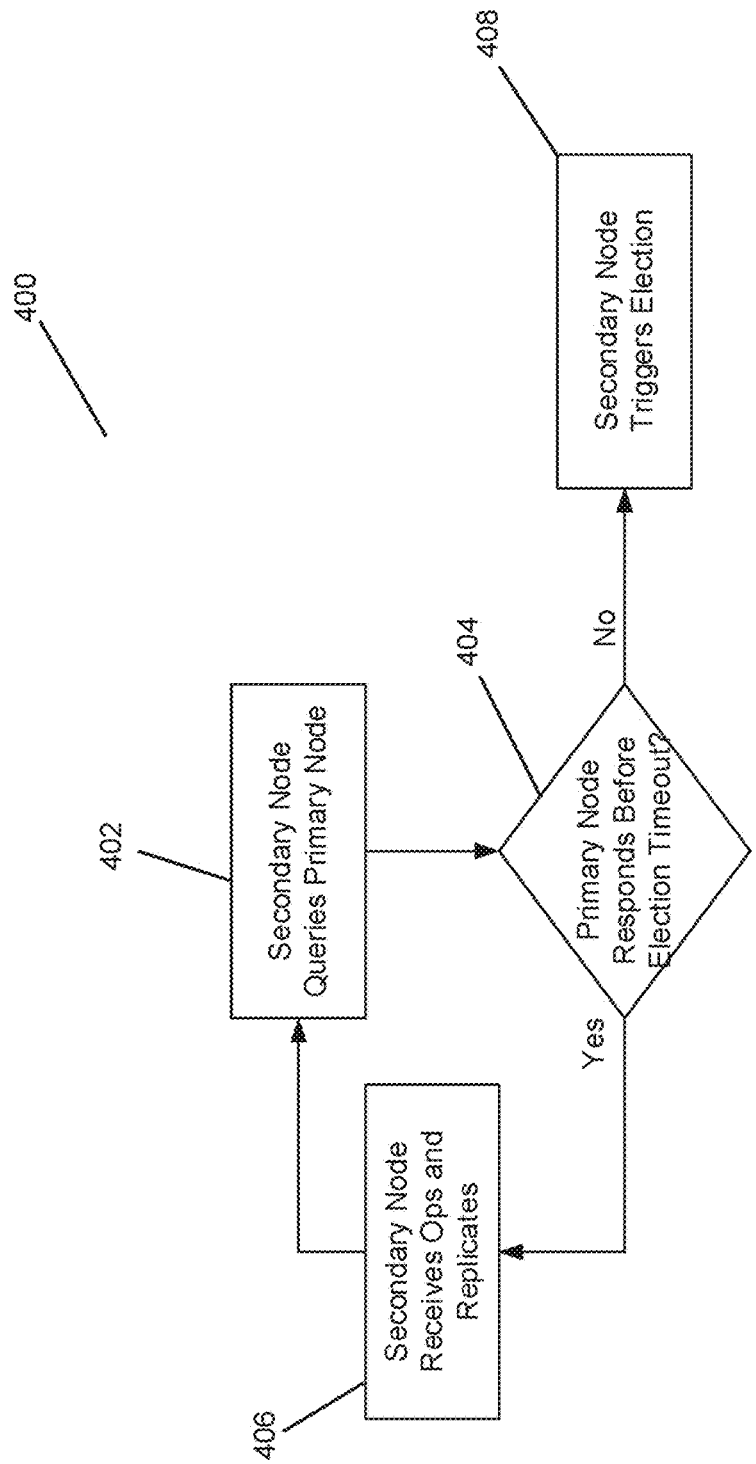
FIG. 4 illustrates an example process flow for a secondary node to detect failure of communication with a primary node.

FIG. 4 illustrates an exemplary process 400 according to which a secondary node may detect a primary node failure and trigger an election. Exemplary process 400 may be executed by a secondary node of a replica set such as replica set 180 described above with respect to FIG. 1.

Exemplary process begins at act 402 where a secondary node executing the process queries a primary node. In some embodiments, the secondary node may communicate a command to query the primary node (e.g. getMore or find commands). The secondary node may communicate the commands in order to receive a record of executed database operations from the primary node. The record of executed operations may, for example, comprise a set of log entries.

Next, exemplary process 400 proceeds to act 404 where the secondary nodes determines whether a response is received from the queried primary node. If the secondary node receives a response from the primary node before an election timeout 404, YES, the process proceeds to act 406 where the secondary nodes receives a record of operations and executes them. The secondary node then returns to act 402 where the secondary node continues to query the primary node.

In some embodiments, the secondary node may have an election timeout that triggers the election process. If the secondary node does not receive a response from the primary node before the election timeout 404, NO, exemplary process 400 proceeds to act 408 where the secondary node initiates an election. The secondary node may, for example, determine a time that has passed since communicating a query command to the primary node. If the time reaches the election timeout 404, NO, the secondary node may initiate an election 410.

Figure 5:
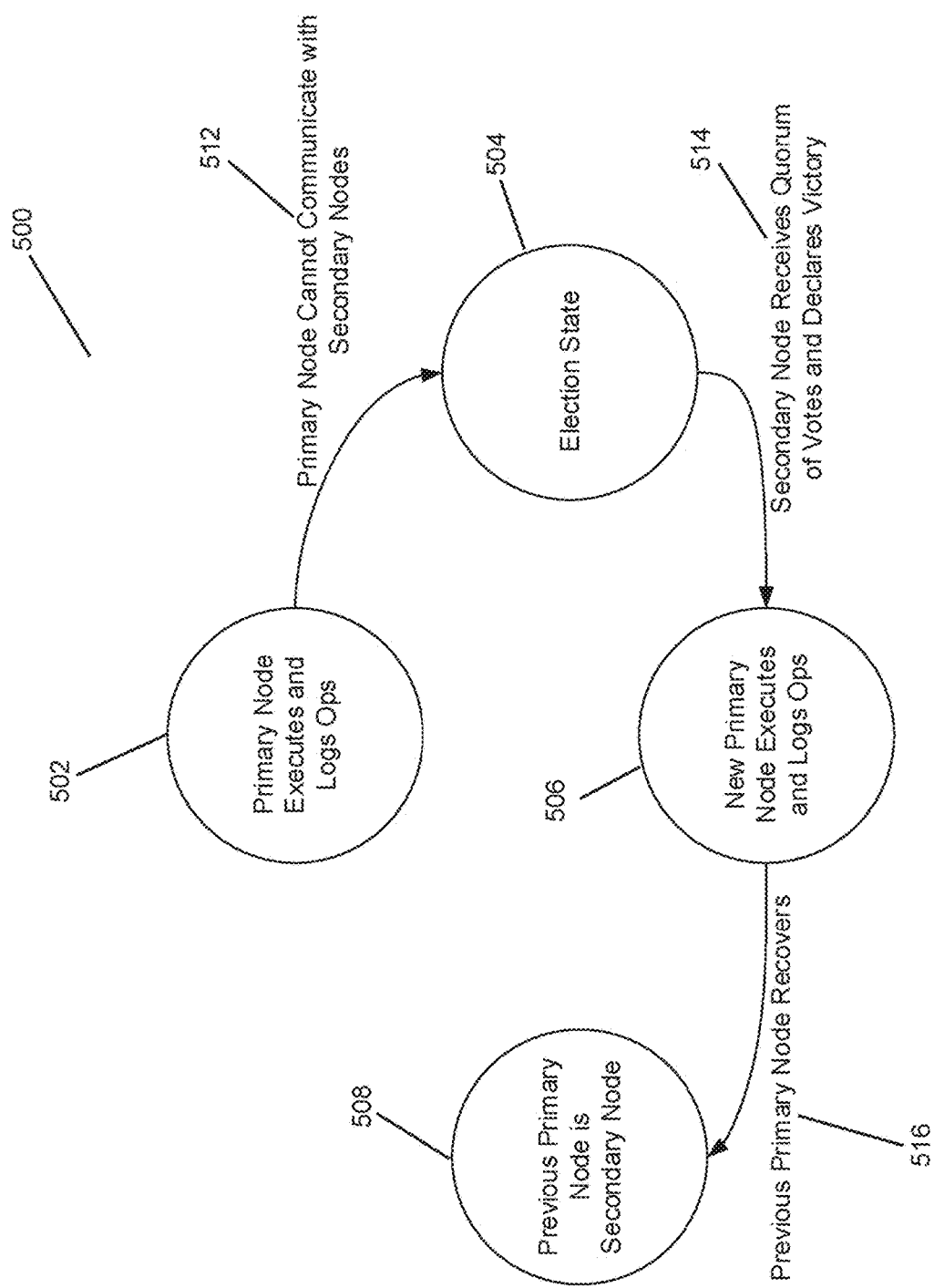
FIG. 5 is a state diagram illustrating an example process by which a primary node may trigger selection of a new primary node.

FIG. 5 illustrates an exemplary state diagram from a primary node to trigger election. The process may be executed by a primary node of a replica set (e.g. replica set 180) in accordance with embodiments described herein.

At state 502, a primary node is in a normal operational state. In some embodiments, the primary node may receive database operation requests from client systems. The primary node may execute database operations in response to the requests. Additionally, the primary node may log executed operations. Furthermore, the primary node may respond to queries from one or more secondary nodes for log entries in order for the secondary nodes to replicate the executed operations of the primary node.

In some embodiments, the primary node may receive liveness communications from secondary nodes of the system. The primary node may, for example, receive a communication from secondary nodes indicating their liveness (e.g. via a replSetUpdatePosition command). As discussed, for example, these communications may be in the form of no-op commands and/or metadata communicated by secondary nodes. In one embodiment, the primary node uses these communications to keep track of liveness of the secondary nodes. The primary node may, for example, determine a time that has passed since receiving a liveness command for all the secondary nodes. For secondary nodes that are not directly in communication with the primary node, the primary node may receive their liveness indication through secondary nodes in direct communication with the primary node.

If the primary node determines that it cannot communicate with a specific number (e.g. majority) of secondary nodes 512, the primary node may initiate an election and the replica set may transition to an election state 504. In one embodiment, the primary node may determine, for each secondary node, an amount of time that has passed since receiving an indication of liveness. If the amount of time for a secondary node exceeds a threshold, the primary node may determine the secondary node to be dead or that the primary node is unable to communicate with the secondary node. If the primary node determines that a certain number of secondary nodes are dead or unable to communicate, the primary node may trigger an election. The primary node may, for example, use times of received liveness indications to track amount of time passed since receipt of the indications and to determine health of communication for each secondary node. If a threshold number of nodes are deemed unhealthy, the primary node may trigger an election.

During election state 504, one of the secondary nodes of the replica set may receive a quorum of votes and declare victory 514. The system then transitions to state 506 where the secondary node becomes the new primary node. The new primary node takes over the role and tasks of the primary node. The original primary node may be down and unable to communicate with other nodes. For example, the original primary node may be stale and unable to replicate operations from the new primary node.

The original primary node may eventually recover 516. In some embodiments, the original primary node may re-establish communication with the new primary node and/or other secondary nodes. The system then transitions to state 508 where the original primary node becomes a secondary node. The node then replicates operations executed by the newly elected primary node.

Figure 6:
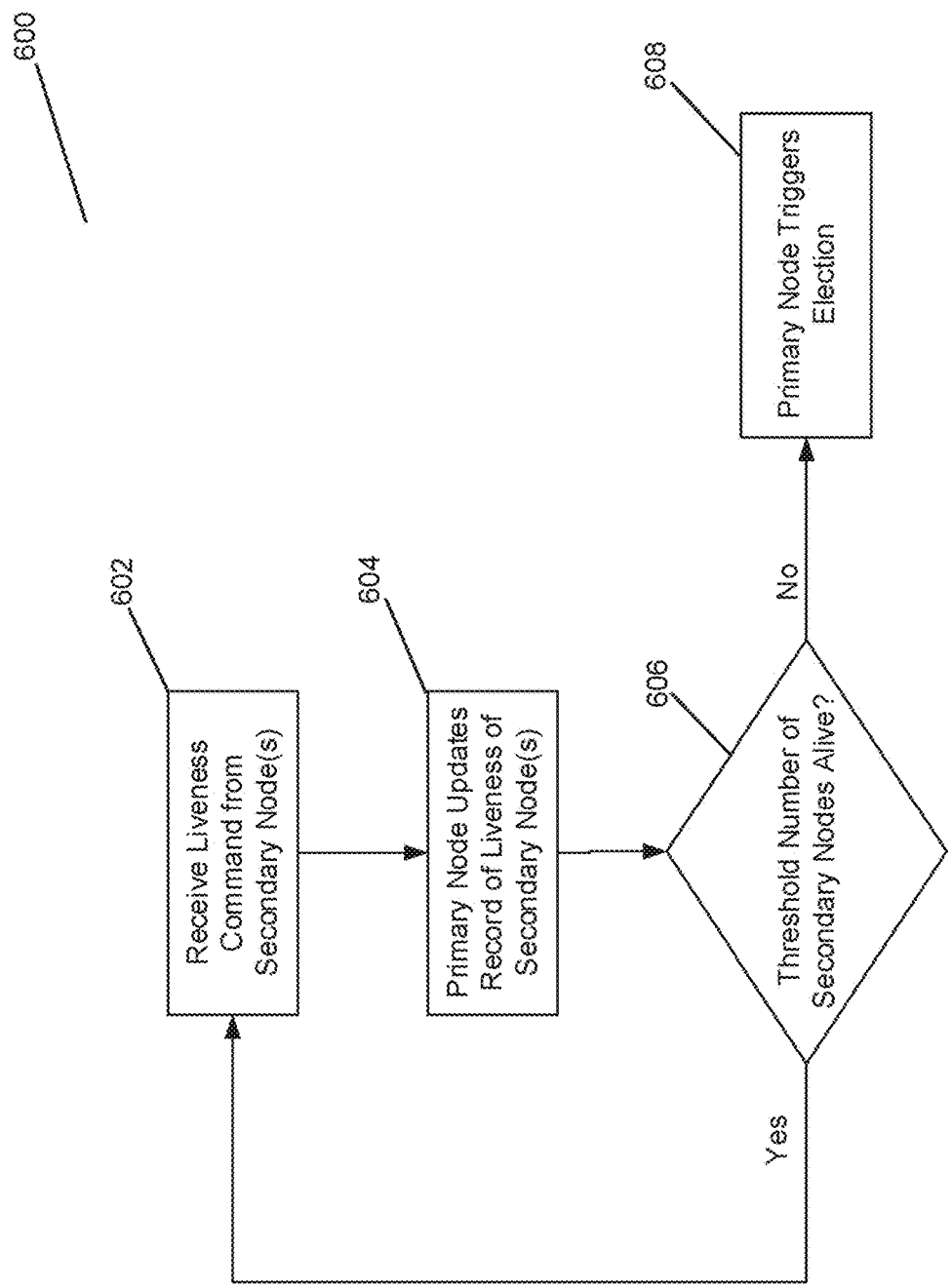
FIG. 6 illustrates an example process flow for a primary node to detect a failure to communicate with secondary nodes.

FIG. 6 illustrates an exemplary process 600 through which a primary node may trigger election of a new primary node. The process 600 may be executed by a primary node of a replica set, e.g. replica set 180 discussed above with respect to FIG. 1.

Exemplary process 600 begins at act 602 where a primary node receives indications of liveness from secondary nodes. In one embodiment, the primary node may receive communications of a liveness command (e.g. a replSetUpdatePosition command) from a plurality of secondary nodes indicating their liveness and/or a health of communication between the primary node and the secondary nodes. In some embodiments, the primary node does not need to receive a liveness indication directly from each secondary node. Chained downstream secondary nodes may have their liveness communicated to the primary node by upstream secondary nodes.

Next, exemplary process 600 proceeds to act 604 where the primary node updates a record of liveness for the secondary nodes. In one embodiment, the primary node may store a record of liveness for the secondary nodes. For example, the primary node may determine when each of the secondary nodes was last updated.

Next, exemplary process 600 proceeds to act 606 where the primary node determines if a threshold number of secondary nodes are alive. The primary node may, for example, determine whether received liveness communications indicate that the majority of secondary nodes are alive and able to communicate with the primary node. If the primary node determines that a threshold number of secondary nodes (e.g. majority of nodes) are alive 606, YES the primary node continues as the primary node and returns to act 602 where the primary node receives liveness indicators from secondary nodes. If, however, the primary node determines that a threshold number of secondary nodes (e.g. majority of nodes) are not alive 606, NO the process proceeds to act 608 where the primary node triggers election of a new primary node.

Election Considerations

In one example, a candidate node undertakes an election by sending commands via direct connections to all known nodes in the configuration. Because the new algorithm can use the spanning tree to communicate liveness, this may result in replica set networks that can stay up in a steady state but may not be able to elect a new primary due to communication problems between individual nodes.

Election Timeout

In some embodiments, a replica set may use election timeouts to trigger elections. In one embodiment, an election timeout may represent an amount of time for communication between a secondary and primary node to remain healthy before triggering an election. As discussed above with respect to process 400, a secondary node may utilize an election timeout to trigger elections.

In one implementation, an election timeout is composed of a base timeout value that all nodes share and a randomized value specific to each node. In some embodiments, to avoid split votes, the randomized value may be set to an appropriately wide enough range. For example, the range may be set such that the range needs to surpass the average latency between nodes. In one example implementation, the base timeout value may be called electionTimeoutMillis, and the randomization factor may be called electionTimeoutOffset. The offset cap, which dictates the range of the random number, is calculated either by a hardcoded percentage of the electionTimeoutMillis, or by overriding with an explicit value, named electionTimeoutOffsetLimit. In one example, a starting default for electionTimeoutMillis can be 5000 milliseconds (5 seconds), with the electionTimeoutOffsetLimit set to 20% of that.

Spanning Tree Maintenance Via replSetHeartbeat Command

In some embodiments, a system may include a low frequency heartbeat in order to maintain a spanning tree. In one embodiment, a primary node may receive a low frequency heart beat command from secondary nodes in the replica set. For example, the low frequency heart beat command may comprise a no-op database command (e.g. a replSetHeartbeat command). The primary node may respond to this heartbeat command to provide state information about the database as metadata. In situations where a chained secondary node loses communication with its sync source (i.e. an upstream secondary node), the low frequency heartbeat command may provide a backup method for the chained secondary node to learn primary node identity and obtain record(s) of executed operations (e.g. oplog entries).

In one implementation, the replication chaining spanning tree is maintained using information collected by infrequent (every two seconds or more) issuance of replSetHeartbeat commands among all nodes in a replica set. In one implementation, these heartbeats may also serve as a liveness backstop on systems where getMore on the oplog collection or oplog application on the secondary have very high latency. However, in one embodiment, concurrency control system may avoid using such mechanisms, as well as for nodes that do not currently have a sync source with which to send liveness information.

In some embodiments, during periods of asymmetric connectivity, it is appreciated that secondaries might learn the identity of new primaries through these heartbeats. For example, if a new primary cannot establish a connection to some secondaries to send election messages, but such secondaries can still successfully open connections to the new primary. In one implementation, replSetHeartbeat includes the same metadata described for getMore and find, below.

getMore and Find Commands

In one implementation, in order to support enhancements to the replication protocol, find and getMore operations may target the oplog return metadata in addition to the stored documents. An example implementation of this metadata is discussed below. In one implementation, replication uses command forms of find and getMore (possibly replication-specific, possibly generic), rather than the find and getMore wire protocol messages.

In some embodiments, replication makes use of two query flags that are not documented for external use:

AwaitData and OplogReplay:

AwaitData, in one implementation, activates a special mode of tailing cursor that waits for more data before returning EOD to the client—this is known as a "long poll".

AwaitData, in one implementation, waits about 1 second before returning. It may not be necessary to adjust this timeout for failover detection logic to be efficient.

AwaitData, in one implementation, employs the use of a condition variable to efficiently detect when new data is written to the oplog. This may not change in one implementation, although the signaling of the condvar can be done in an OperationObserver.

OplogReplay, in one implementation, a special way of efficiently finding a particular ts entry in an oplog On one implementation of MMAPv1, it uses knowledge of capped collection and extent layouts to divide the search space In one implementation, WiredTiger storage engine uses a special index on ts.

In some embodiments, there is also special code to make sure the oplogReader does not read storage-engine-uncommitted records, as these could be rolled back if a storage-engine-transaction aborts. Note this has nothing to do with replication rollbacks, which are at a higher level.

On MMAPv1, for insertion efficiency, the oplog has no indexes, even on id, so this query flag is necessary for efficient oplog queries.

getMore and Find Metadata

In one embodiment, in addition to returning the requested oplog entries, find and getMore on oplog cursors in use by replication may return the metadata fields described below. In one implementation, when a downstream secondary chains from an upstream secondary, the upstream secondary will return the most current form of the metadata it has received from its own sync source (e.g. an upstream secondary node or the primary node). In some embodiments, the metadata may include the following information:

lastOpCommitted The current commit optime, reported by the primary

This is the latest optime that a majority of nodes have affirmatively written to their oplog. Entries in the oplog with optimes no greater than this value will not roll back without external intervention. They are thus considered committed.

The Raft protocol utilizes a leaderCommit argument to an AppendEntries remote procedure call (RPC).

Reconfigure also uses this information to serialize reconfigurations.

The identity of the current primary or leader ID.

In the Raft protocol, this is leader Id

In some embodiments, the leader ID may be used to update chained secondaries' record of who the current primary is, so that calls to determine the primary (e.g. isMaster calls) can be up to date.

In some embodiments, an index of the current primary leader from a replica set configuration may be used.

In one embodiment, the configuration version may be used to confirm that the index of the current primary leader is valid.

In some embodiments, if there is no primary, the system may use a default value (e.g. −1).

In one embodiment, using the ID (e.g., value of the _id parameter) value of the primary is not as ideal, as there is no clear sentinel that may be used to indicate 'no primary'.

The upstream node's value of the current election term (e.g. the currentTerm parameter)

Mongos Considerations

Mongos may comprise a routing service in embodiments of MongoDB database systems. Mongos may process operation requests received from client systems (e.g. client systems 120 and 13). Mongos may determine locations of data in a replica set in order to complete an operation request. The Mongos may further return information back to the client system. In some embodiments, Mongos may execute various versions of database commands (e.g. find and/or getMore commands) in order to retrieve metadata as part of the processing.

In one implementation, the extra metadata may not be collated and returned by the mongos versions of find and getMore commands. In another implementation, the system may be capable of propagating the information back to clients via mongos.

In one implementation, the system may attach term id to each op in the oplog—A term id helps identify which primary produced a given op; this is helpful in undertaking a rollback operation.

In one embodiment, an oplog entry has an h (hash) field, a 64 bit integer that is a calculation based on the prior hash, the node's replica set configuration id, and the current timestamp.

In one embodiment, the term is not stored in a hash field. Instead, a new field "t" (term) is added.

In one embodiment, the term id is incremented for each election attempt when a node transitions to candidate status.

In one embodiment, the field name can remain "h" for backwards compatibility.

According to one implementation, both old and new protocols can understand how to interpret both old and new log formats, making upgrade and downgrade procedures easier. In one embodiment, the primary node may always add the term to the oplog even if in protocol version 0.

Example

Current oplog document:
{"ts": Timestamp(1424293143, 1), "h": NumberLong (432750029), "v": 2, "op": "n", "ns": " ", "o": {"msg": "initiating set"}}

New oplog document:
{"ts": Timestamp(1424293143, 1), "h": NumberLong(1), "t": NumberLong(1), "v": 2, "op": "n", "ns": " ", "o": {"msg": "initiating set"}}

In some embodiments, OpTime may be used to compare terms. In one implementation, OpTime always compares terms even if in protocol version 0. This may provide continuing functionality of items in protocol version 0 because the version does not change at the beginning of protocol version 0. In some embodiments, the term is left unchanged during a downgrade. As a result the term remains unchanged. In one embodiment, if any of the two OpTimes in comparison lacks term(s), they can be compared by timestamp and fall back to protocol version 0 that relies on the order of timestamp to be satisfied.

Tracking Committed Ops

In the Raft protocol, the leader keeps track of the commitIndex, which is the last op the leader is allowed to apply. In one embodiment of MongoDB database, the primary calculates a value of a last committed operation (e.g. lastOpCommitted) as the latest op in the oplog that the primary knows a majority of the replica set members have written. In one implementation, the primary keeps a state map of all the replica set members and their last applied op; the primary may use this state map to calculate the value of lastOpCommitted. This value indicates that all ops up to and including itself are committed—they will not be rolled back in the future. lastOpCommitted is of value to clients and to internal replication operations. The secondaries receive the primary's notion of lastOpCommitted as they pull ops down the wire via find/getMore, and update their own local copies of lastOpCommitted.

Newly Elected Nodes Must Commit a First Operation

One of the Raft requirements includes that a newly elected leader cannot change the commit level until the elected leader has committed one operation in the new term. To enforce this, the commit level calculation may be amended slightly. In one implementation, upon election, a primary writes a no-op entry into the oplog announcing its election and the new term. The primary may then make a note of that entry's optime. This optime can be stored non-durably adjacent to the state map. Now, when calculating a new commit level, this initial optime provides a floor; the commit level cannot change unless the commit level is greater than or equal to this optime.

Election Protocol

A new election protocol may be defined with some modifications. Unlike in Raft, where followers have operations pushed to them by the leader, in some embodiments, secondaries pull oplog entries. Because of this, in some embodiments, the winning candidate of an election must broadcast a final message indicating that the winning candidate is the new leader. In Raft, the AppendEntries RPC suffices for this. In some embodiments, this message can take the form of a new election winning declaration command (e.g., a replSetDeclareElectionWinner command).

Example replication commands are summarized below. Steady-state operation replication and leader election may, in one implementation, otherwise proceed similarly in Raft.

Durable Record of Current Term and Voting Record

To ensure that a node cannot vote more than once in any particular term, according to one implementation, a node is required to durably record the current term and the id (string HostAndPort in MongoDB) of the candidate voted for in that term, if any. In one implementation, the node must record this data before responding to vote request commands, such as replSetRequestVotes. Storing this information in transient memory is not sufficient, as a node that is shut down and restarted has no notion of what terms in which the node may have already voted 'aye'. This restriction may increase the minimum possible time for an election and thus may negatively impact failover time.

In some embodiments, at initial startup time, a node's current operation log term (e.g. currentTerm) value may begin with a value of 0. Thus, in one implementation, the node cannot vote 'aye' in any requestVotes command until the node has established the current term. This will happen, for example, as soon as the node receives any command with a term present.

Priorities

In one implementation of a consensus protocol, individual elections are not "priority aware." Instead, the nodes take steps to ensure that the highest priority electable node eventually becomes primary, with some extra logic to prevent election flapping. Note that the following exemplary steps assume there is a current primary node p; if there is no primary, the algorithm may proceed as if a primary existed with the lowest (least) possible priority.

1. When a node h has priority higher than the primary node p, the node h consults its internal table of heartbeat data to see if the node believes that it is in contact with a majority of voting nodes. If the node h is, it then determines its own priority rank, pr. The priority rank of a node is the number of nodes in the configuration of the replica set with priority greater than that node's.

2. Node h then waits for (pr+1)*election timeout+random offset milliseconds. This helps to ensure that highest priority nodes have the first chance at changing the set's topology, but avoids election flapping. The offset helps to avoid ties between equal priority nodes. As mentioned above, this is a random number generated to have 3. Next, if the currentTerm has not changed during the timeout period, node h checks to see if it is caught up to within the usual election-lower-bound of the primary's oplog. If so, the node h asks p to step down and catches up to the end of p's oplog. If currentTerm is still unchanged, h increments its currentTerm and starts an election, with the expectation that it will win and become primary. If any of this fails, it just restarts its election timeout using the rank ordering as before. Using a timeout with rank ordering will tend to increase failover time for lower-priority nodes, but will reduce flapping election situations.

Election Timeout Setting

The election timeout, according to one implementation, is a user-definable setting in the server, changeable at run-time. In one embodiment, an administrator may choose a value that satisfies the Raft timing requirement:

broadcastTime<<electionTimeout<<mean time between failures of a node (MTBF) wherein broadcastTime is the average time it takes a node to send out a query to a remote node and receive its response and MTBF is the mean time between failures of a single node. By selecting a lower value for electionTimeout, an administrator can reduce average failover time at the expense of a greater sensitivity to transient network or node slowness. By selecting a higher value for electionTimeout, the replica set will be more resistant to network issues, but average failover time in the face of an actual node failure is higher.

This election timeout may be implemented, for example, using send/receive socket timeouts. The heartbeat command as well as find/getMore commands can use a socket timeout, because, according to one embodiment, both mechanisms are used to determine liveness. In addition, the election command replSetRequestVotes may employ the socket timeout as well.

It can be noted that this implementation may require a new way to dictate the AwaitData timeout for the find command; In one implementation the timeout is hardcoded and prevents the election timeout from being set lower than the AwaitData timeout.

Upgrade/Downgrade Implementation

According to one embodiment, upgrades/downgrades of the consensus protocol may be achieved via replica set reconfiguration. In one implementation, new configurations may contain a "protocolVersion" field with a value of 1, in order to start using the new protocol. In one implementation, to upgrade an existing replica set, an administrator may execute a reconfiguration command (e.g., a replSetReconfig command) with a "protocol Version" field set to 1. In some embodiments, the reconfiguration command queries all reachable nodes and will fail if any nodes are not running a mongod binary capable of supporting the new protocol. In another example, an old-version daemon process that handles data requests, accesses, and performs other background management operations (e.g. a mongod) may refuse to join a cluster running with a configuration with protocolVersion=1.

Upon a reconfiguration that activates the new protocol, the current primary begins with term 1. In one implementation, this will be true even if the current primary was not the node that ran the replSetReconfig command (e.g. if it was a force reconfiguration).

After a secondary upgrades to the new protocol, the secondary may still receive and apply oplog entries generated by a primary in the old protocol. The new protocol can interpret the new log format correctly by checking if "t" field exists. If "t" is absent, the secondary may assume all oplog entries are from the default term 0, so any entries before upgrade will have a "t" field value less than those created by new protocol indicating that the entries were executed prior to the upgrade.

According to another implementation, a downgrade works like an upgrade, but in reverse. The configuration in this case arrives through the heartbeat. The current primary stops adding the term to new oplog entries. On reconfiguration, secondaries immediately change the way they interpret the entries because, according to one implementation, the oplog format is backwards-compatible. Any protocolVersion=0-style commands received by a protocolVersion=1 configured node will, in one example, return a failed response. For instance, in one implementation, any new-style commands received by a protocolVersion<1 configured node will return a failed response. In the case of failure of upgrade/downgrade, the mix of old and new protocol can, in one implementation, exist. After the restart, heartbeats can propagate the new configuration to the rest of replset, so this function will only affect availability, not safety.

Replication Commands

In one example implementation, the "term" field in requests and responses is used to propagate information about the highest term value among nodes. If a node sees a term value higher than its own currentTerm, the node bumps its currentTerm to that value. This is true if the term is in a command request object or a response object. Commands are targeted at the admin database except for find and getMore, which are targeted at local (to read the oplog).

find and getMore

Note that these modifications may not be necessary if new wire protocol message formats are created for commands, in which the system may send and receive metadata.

Find Request (Additional Replication Information in Italics):

```
{ find: "oplog.rs", filter: <Query Object>, awaitData:
    true, oplogReplay: true, term: <NumberLong>,
    $replData: 1
}
```

Find Response:

```
{ cursor: {
    id: <NumberLong>, ns: "oplog.rs", firstBatch: [ ... ]
  },
  ok: 1,
  $replData: {
    term: <NumberLong>,
    lastOpCommitted: {ts: <Timestamp>, t: <NumberLong>},
    lastOpVisible: {ts: <Timestamp>, t: <NumberLong>},
    configVersion: <NumberInt>,
    primaryId: <NumberInt>
  }
}
```

GetMore Request:

```
{ getMore: <cursorid>, collection: "oplog.rs", term:
    <NumberLong>,
    lastKnownCommittedOpTime: {ts: <Timestamp>, t:
    <NumberLong>},
    $replData : 1
}
```

GetMore Response:

```
{ cursor: {
    id: <NumberLong>, ns: "oplog.rs", nextBatch: [ ... ]
  }
  ok: 1
  $replData: {
    term: <NumberLong>,
    lastOpCommitted: {ts: <Timestamp>, t: <NumberLong>},
    lastOpVisible: {ts: <Timestamp>, t: <NumberLong>},
    configVersion: <NumberInt>,
    primaryId: <NumberInt>
  }
}
``` replSetHeartbeat (in protocolVersion=1 mode)
Request:

```
{ replSetHeartbeat: <rs name>, configVersion: <NumberInt>,
    checkEmpty: <Boolean> (optional flag set by initial sync
  manual heartbeat)
    fromId: <NumberInt>, term: <NumberLong>
}
```

Response:

```
{ ok: 1,
    hasData: <Boolean> (only if checkEmpty was true) (true if
        db's other than local exist on this
        node),
    set: <rs name>, state: <NumberInt>,
    lastOpTime: {ts: <Timestamp>, t: <NumberLong> } (last
optime written by this node)
```

```
    syncingTo: <String> (hostAndPort), configVersion:
    <NumberInt> primaryId: <NumberInt>,
    term: <NumberLong>,
    config: { ... } // When response configVersion != request
        // configVersion
}
```

Implementation Examples

A regularly generated heartbeat command communicated between nodes of a replicat set (e.g. a kHeartbeatInterval command) can, in one example implementation, be raised to something much higher than 2 seconds, when in protocol-Version=1 mode. Liveness can then be managed by responses to database commands (e.g. find/getmore and updatePosition commands). In some embodiments, note that arbiters will not be using the find/getmore/updatePosition mechanism for liveness, so they will continue to use only heartbeats for liveness. Thus, they may ignore a user-defined kHeartbeatInterval, and instead use the find/getmore/updatePosition keepalive interval instead.

Successful heartbeats can be configured to update the slaveMap's lastUpdate field.

replSetHeartbeat (Without protocolVersion=1; Unchanged From Mongod 3.0)
Request:

```
{ replSetHeartbeat: <rs name>,
    v: <NumberInt> (config version), pv: 1
    checkEmpty: <Boolean> (flag set by initial sync manual
        heartbeat) from <string: hostAndPort>
    fromId: <NumberInt> (id) (Not supplied if doing initial
        reconfig)
}
```

Response:

```
{ ok: 1,
rs: true,
,
    hasData: <Boolean> (only if checkEmpty was true) (true if
        db's other than local exist on this node),
    hbmsg: "still initializing" (if node hasn't finished
initial reconfig; no other fields are provided after this),
    mismatch: true (if repl set names do not match; no other
        fields are provided after this), set: <rs name>,
    state: <NumberInt>,
    electionTime: <Date> (only if state is 1 [primary])
    e: <Boolean> (node is in the electableSet, e.g. within 10
seconds of primary and some other conditions)
    hbmsg: <string> (current hbmsg string field describing
the disposition of the node; this displays in
replSetGetStatus report)
    time: <NumberLong>, node's time when the hb command was
        received opTime: <Date> (last optime written by this
        node)
    syncingTo: <string> (hostAndPort of sync target, if one
        exists)
    config: { <Object> } (only if our version is greater than
        the configVersion from the command) stateDisagreement:
        true (field only appears if we receive a hb from a node
        that we currently
think is Down)
}
``` replSetRequestVotes

In one implementation, the replSetRequestVotes command is sent to all voting members in two rounds in an attempt to be elected the new primary. In the first round, a parameter indicative of a dry run (e.g. the dryRun parameter) will be set to true, indicating that recipients ought not to increment their local term or vote (e.g. by setting a votedFor value). If a majority of the voting members respond affirmatively and no vetoes or affirmative responses with an equal term are received, initiate the second (e.g., dryRun: false) round. If a majority of voting members respond affirmatively to the second round, step up to primary.

Request:

```
{
    replSetRequestVotes: 1, setName: <String>, dryRun: <Bool>,
    term: <NumberLong>, candidateID: <NumberInt>,
    configVersion: <NumberLong>,
    lastEntry: { ts: <timestamp>, t: <NumberLong> }
}
```

Response:

```
{
    ok: 1,
    term: <NumberLong>, voteGranted: <Boolean>, reason:
    <String>
}
```

Example Error Response:

```
{
    ok: 1,
    term: 2, voteGranted: false,
    reason: "candidate's config version is lower than mine"
}
```

Upon receipt of such a command, first check if protocol Version is 1; if not, return error.

Reply voteGranted:false if term in Request<currentTerm, or if local votedFor isn't the candidate (or empty), or if local configVersion is higher than the candidate's, or if set name does not match, or if lastEntry is less than local lastAppliedOpTime.

If granting a vote, first durably store votedFor (e.g. request's candidateId) and currentTerm. Then build Response and return.

votedFor and term need to be stored in one document, "local.replset.election" for example. Helper functions may be used to save and load the values from the storage engine into local variables. In one implementation, the values can be loaded once, at startup, and thereafter they may be written to (and wait for journal) each time they are updated. The term and votedFor may be stored in the topology coordinator, but since updating them requires writing to the db, the repl executor's ability to write to the db using threads may be leveraged in one implementation.

replSetGetStatus
  No changes.
replSetFreeze
  Proposed to make it a synonym for a revised replSetStepDown. SERVER-17289
replSetInitiate
  No change.
replSetMaintenance
  Unchanged.
replSetReconfig
  Unchanged.
replSetStepDown
replSetSyncFrom
  Unchanged.
replSetUpdatePosition According to one implementation, this function changes to ensure that oplog data has been durably stored (journal flush) before sending oplog position information upstream. This will result in longer write concern waits for client writes, but is a necessity in order to satisfy the requirements of Raft.

This may also, in some implementations, need to support the transmission of node liveness in addition to node position, so that the primary can know if the primary can still see a majority of the cluster. In one embodiment, rather than including all nodes with optimes, only nodes that have had an optime change or a lastUpdate change since the last command are be included in the replSetUpdatePosition command. In order to keep track of which nodes have been mentioned in a prior command, the system may clear the lastUpdate field in the slaveMap after a successful replSetUpdatePosition.

In one implementation, no node states will be changed to DOWN as a result of receiving a replSetUpdatePosition command; however, nodes states can be changed to UP.

Additionally or alternatively, the system may adjust the socket timeout on the connection before issuing this command, to reflect the current election timeout.

Keepalives

In one implementation, the format of an update position command (e.g., a replSetUpdatePosition command) may indicate liveness in addition to position, for all downstream members. Upon receiving a replSetUpdatePosition command, a non-primary node may update the slaveMap with any new opTime information. In addition, the non-primary may update a new "lastUpdated" field in the slaveMap for all updated slaves. Then the non-primary may immediately send a replSetUpdatePosition command upstream to the non-primary's sync source, if it has one. The non-primary may also affix an array of downstream nodes that are known to be up; this array can be formed by looking in the slaveMap and choosing all nodes that have a lastUpdated field that is more recent than the timepoint [current time minus the election timeout].

In some embodiments, for primary nodes, the local node liveness table needs to be checked even if no active updatePosition commands are being run. This means the state updater needs to be scheduled at the next possible liveness failure time point. For example, with a slaveMap that looks like this:

arbiter, lastUpdate: 03:02:04 (updated via heartbeat) node1, lastUpdate: 03:02:00 (updated via updatePosition)
node2, lastUpdate: 03:02:01 (ditto)
node3, lastUpdate: 03:02:04 (ditto) self, lastUpdate: <irrelevant>

In the above example, assuming all nodes are voters, a quorum is thus 3 nodes. If the current time is now 03:02:04, and the election timeout is 2 seconds, node1 and node2 may already be marked as DOWN. The next liveness update check may be scheduled at 03:02:06, since that is the earliest time that another node may need to be marked as DOWN. If the liveness checker does indeed run at 03:02:06, the primary node can mark the arbiter and node3 as DOWN. If, however, a successful heartbeat completes for arbiter or node3, or a successful updatePosition command is received with node3 present (but not necessary directly from node3), then the liveness update scheduled for 03:02:06 can be cancelled. A new liveness update run can then be scheduled for a new time, based on the newly updated slaveMap.

resync
    Unchanged.
isMaster
    Unchanged.

Various aspects and functions described herein may be implemented as specialized hardware or software components executing in one or more specialized computer systems. There are many examples of computer systems that are currently in use that could be specially programmed or specially configured. These examples include, among others, network appliances, personal computers, workstations, mainframes, networked clients, servers, media servers, application servers, database servers, and web servers. Other examples of computer systems may include mobile computing devices (e.g., smart phones, tablet computers, and personal digital assistants) and network equipment (e.g., load balancers, routers, and switches). Examples of particular models of mobile computing devices include iPhones, iPads, and iPod Touches running iOS operating systems available from Apple, Android devices like Samsung Galaxy Series, LG Nexus, and Motorola Droid X, Blackberry devices available from Blackberry Limited, and Windows Phone devices. Further, aspects may be located on a single computer system or may be distributed among a plurality of computer systems connected to one or more communications networks.

Figure 7:
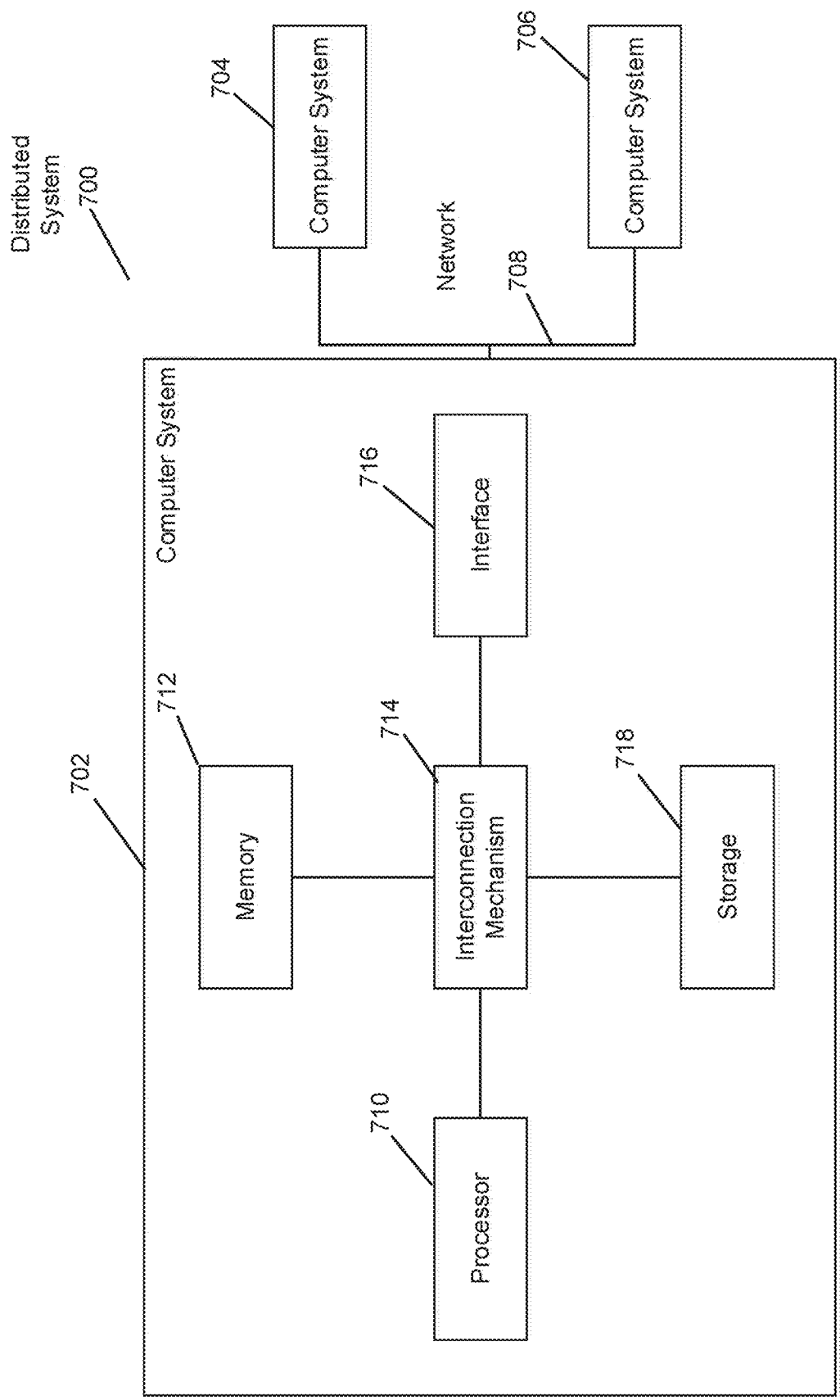
FIG. 7 is a schematic diagram of an exemplary computer system that may be specially configured to perform processes and functions disclosed herein.

For example, various aspects, functions, and processes may be distributed among one or more computer systems configured to provide a service to one or more client computers, or to perform an overall task as part of a distributed system, such as the distributed computer system 700 shown in FIG. 7. Additionally, aspects may be performed on a client-server or multi-tier system that includes components distributed among one or more server systems that perform various functions. Consequently, embodiments are not limited to executing on any particular system or group of systems. Further, aspects, functions, and processes may be implemented in software, hardware or firmware, or any combination thereof. Thus, aspects, functions, and processes may be implemented within methods, acts, systems, system elements and components using a variety of hardware and software configurations, and examples are not limited to any particular distributed architecture, network, or communication protocol.

Referring to FIG. 7, there is illustrated a block diagram of a distributed computer system 700, in which various aspects and functions are practiced. As shown, the distributed computer system 700 includes one or more computer systems that exchange information. More specifically, the distributed computer system 700 includes computer systems 702, 704, and 706. As shown, the computer systems 702, 704, and 706 are interconnected by, and may exchange data through, a communication network 708. The network 708 may include any communication network through which computer systems may exchange data. To exchange data using the network 708, the computer systems 702, 704, and 706 and the network 708 may use various methods, protocols and standards, including, among others, Fiber Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST, and Web Services. To ensure data transfer is secure, the computer systems 702, 704, and 706 may transmit data via the network 708 using a variety of security measures including, for example, SSL or VPN technologies. While the distributed computer system 700 illustrates three networked computer systems, the distributed computer system 700 is not so limited and may include any number of computer systems and computing devices, networked using any medium and communication protocol.

As illustrated in FIG. 7, the computer system 702 includes a processor 710, a memory 712, an interconnection element 714, an interface 716 and data storage element 718. To implement at least some of the aspects, functions, and processes disclosed herein, the processor 710 performs a series of instructions that result in manipulated data. The processor 710 may be any type of processor, multiprocessor or controller. Example processors may include a commercially available processor such as an Intel Xeon, Itanium, Core, Celeron, or Pentium processor; an AMD Opteron processor; an Apple A4 or A5 processor; a Sun UltraSPARC processor; an IBM Power5+ processor; an IBM mainframe chip; or a quantum computer. The processor 710 is connected to other system components, including one or more memory devices 712, by the interconnection element 714.

The memory 712 stores programs (e.g., sequences of instructions coded to be executable by the processor 710) and data during operation of the computer system 702. Thus, the memory 712 may be a relatively high performance, volatile, random access memory such as a dynamic random access memory ("DRAM") or static memory ("SRAM"). However, the memory 712 may include any device for storing data, such as a disk drive or other nonvolatile storage device. Various examples may organize the memory 712 into particularized and, in some cases, unique structures to perform the functions disclosed herein. These data structures may be sized and organized to store values for particular data and types of data.

Components of the computer system 702 are coupled by an interconnection element such as the interconnection element 714. The interconnection element 714 may include any communication coupling between system components such as one or more physical busses in conformance with specialized or standard computing bus technologies such as IDE, SCSI, PCI and InfiniBand. The interconnection element 714 enables communications, including instructions and data, to be exchanged between system components of the computer system 702.

The computer system 702 also includes one or more interface devices 716 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 702 to exchange information and to communicate with external entities, such as users and other systems.

The data storage element 718 includes a computer readable and writeable nonvolatile, or non-transitory, data storage medium in which instructions are stored that define a program or other object that is executed by the processor 710. The data storage element 718 also may include information that is recorded, on or in, the medium, and that is processed by the processor 710 during execution of the program. More specifically, the information may be stored in one or more data structures specifically configured to conserve storage space or increase data exchange performance. The instructions may be persistently stored as encoded signals, and the instructions may cause the processor 710 to perform any of the functions described herein. The medium may, for example, be optical disk, magnetic disk or flash memory, among others. In operation, the processor 710 or some other controller causes data to be read from the nonvolatile recording medium into another memory, such as the memory 712, that allows for faster access to the information by the processor 710 than does the storage medium included in the data storage element 718. The memory may be located in the data storage element 718 or in the memory 712, however, the processor 710 manipulates the data within the memory, and then copies the data to the storage medium associated with the data storage element 718 after processing is completed. A variety of components may manage data movement between the storage medium and other memory elements and examples are not limited to particular data management components. Further, examples are not limited to a particular memory system or data storage system.

Although the computer system 702 is shown by way of example as one type of computer system upon which various aspects and functions may be practiced, aspects and functions are not limited to being implemented on the computer system 702 as shown in FIG. 7. Various aspects and functions may be practiced on one or more computers having a different architectures or components than that shown in FIG. 7. For instance, the computer system 702 may include specially programmed, special-purpose hardware, such as an application-specific integrated circuit ("ASIC") tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 702 may be a computer system including an operating system that manages at least a portion of the hardware elements included in the computer system 702. In some examples, a processor or controller, such as the processor 710, executes an operating system. Examples of a particular operating system that may be executed include a Windows-based operating system, such as, the Windows-based operating systems, available from the Microsoft Corporation, a MAC OS System X operating system or an iOS operating system available from Apple Computer, one of many Linux-based operating system distributions, for example, the Enterprise Linux operating system available from Red Hat Inc., or a UNIX operating system available from various sources. Many other operating systems may be used, and examples are not limited to any particular operating system.

The processor 710 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, Java, C++, C# (C-Sharp), Python, or JavaScript. Other object-oriented programming languages may also be used. Alternatively, functional, scripting, or logical programming languages may be used.

Additionally, various aspects and functions may be implemented in a non-programmed environment. For example, documents created in HTML, XML or other formats, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements (e.g., specialized hardware, executable code, data structures or objects) that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user space application) or in a commonly shared data structure (such as an application registry that is defined by an operating system). In addition, some examples provide for both system and user interfaces that allow external entities to modify the parameters and thereby configure the behavior of the components.

Based on the foregoing disclosure, it should be apparent to one of ordinary skill in the art that the embodiments disclosed herein are not limited to a particular computer system platform, processor, operating system, network, or communication protocol. Also, it should be apparent that the embodiments disclosed herein are not limited to a specific architecture or programming language.

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Also, the phraseology and terminology used herein is for the purpose of description and should not be regarded as limiting. Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Use of at least one of and a list of elements (e.g., A, B, C) is intended to cover any one selection from A, B, C (e.g., A), any two selections from A, B, C (e.g., A and B), any three selections (e.g., A, B, C), etc., and any multiples of each selection. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method for maintaining consensus in a distributed database system comprising a plurality of nodes, the method comprising:
    establishing a primary node having a primary node role within the distributed database system and the primary node hosting a database, wherein the distributed database system provides one or more responses to database requests from one or more client computer systems;
    establishing a plurality of secondary nodes having a secondary node role, wherein each secondary node is associated with the primary node and hosts a replica of the database hosted by the primary node;
    replicating, from the primary node, an executed database access operation to secondary nodes associated with the primary node;
    communicating heartbeat information as metadata within a database access operation function for the executed database access operation; and
    automatically recovering the primary node role in the distributed database system in response to a detected failure of the primary node by an absence of the heartbeat information.

2. The method of claim 1, wherein the executed database access operation includes a write operation, and wherein communicating heartbeat information as metadata within a database access operation function for the executed database access operation comprises communicating heartbeat information as metadata within a write operation function for the write operation.

3. The method of claim 1, wherein the executed database access operation includes a no-operation command, and wherein communicating heartbeat information as metadata within a database access operation function for the executed database access operation comprises communicating heartbeat information as metadata within a no-operation command function for the no-operation command.

4. The method of claim 1, wherein the metadata includes database state information for the primary node, an identifier for the primary node, and/or time stamp information relating to the executed database access operation.

5. The method of claim 1, wherein a secondary node, of the plurality of secondary nodes, determines, based on the metadata, an amount of time that the secondary node has failed to establish communication with the primary node.

6. The method of claim 5, wherein the secondary node determines a failure of the primary node to communicate the heartbeat information based on the amount of time being greater than or equal to an election timeout associated with the secondary node.

7. The method of claim 6, wherein:
    the secondary node has an associated priority, and
    the election timeout associated with the secondary node is adjusted according to the associated priority, wherein a higher priority results in a lower election timeout.

8. The method of claim 1, wherein automatically recovering the primary node role in the distributed database system in response to a detected failure of the primary node by an absence of the heartbeat information comprises:
    establishing one of the plurality of secondary nodes as a new primary node having the primary node role;
    deleting replicated operations received by the new primary node from the original primary node; and
    establishing a point of consistency within the database between the new primary node and remaining secondary nodes as a new current state of the database.

9. The method of claim 8, wherein establishing one of the plurality of secondary nodes as a new primary node having the primary node role comprises:
    electing automatically, in response to the detected failure of the primary node, the new primary node from the plurality of secondary nodes; and
    establishing for the new primary node at least one secondary node to replicate operations.

10. The method of claim 1, wherein replicating, from the primary node, an executed database access operation to secondary nodes associated with the primary node includes committing the executed database access operation in response to an acknowledgement of the executed database access operation from a threshold number of nodes responsible for related data.

11. A system for maintaining consensus in a distributed database system comprising a plurality of nodes, the system comprising:
    at least two processors configured to:
        establish a primary node having a primary node role within the distributed database system and the primary node hosting a database, wherein the distributed database system provides one or more responses to database requests from one or more client computer systems;
        establish a plurality of secondary nodes having a secondary node role, wherein each secondary node is associated with the primary node and hosts a replica of the database hosted by the primary node;
        replicate, from the primary node, an executed database access operation to secondary nodes associated with the primary node;
        communicate heartbeat information as metadata within a database access operation function for the executed database access operation; and
        automatically recover the primary node role in the distributed database system in response to a detected failure of the primary node by an absence of the heartbeat information.

12. The system of claim 11, wherein the executed database access operation includes a write operation, and wherein communicating heartbeat information as metadata within a database access operation function for the executed database access operation comprises communicating heartbeat information as metadata within a write operation function for the write operation.

13. The system of claim 11, wherein the executed database access operation includes a no-operation command, and wherein communicating heartbeat information as metadata within a database access operation function for the executed database access operation comprises communicating heartbeat information as metadata within a no-operation command function for the no-operation command.

14. The system of claim 11, wherein the metadata includes database state information for the primary node, an identifier for the primary node, and/or time stamp information relating to the executed database access operation.

15. The system of claim 11, wherein a secondary node, of the plurality of secondary nodes, determines, based on the metadata, an amount of time that the secondary node has failed to establish communication with the primary node.

16. The system of claim 15, wherein the secondary node determines a failure of the primary node to communicate the heartbeat information based on the amount of time being greater than or equal to an election timeout associated with the secondary node.

17. The system of claim 16, wherein:
the secondary node has an associated priority, and
the election timeout associated with the secondary node is adjusted according to the associated priority, wherein a higher priority results in a lower election timeout.

18. The system of claim 11, wherein automatically recovering the primary node role in the distributed database system in response to a detected failure of the primary node by an absence of the heartbeat information comprises:
establishing one of the plurality of secondary nodes as a new primary node having the primary node role;
deleting replicated operations received by the new primary node from the original primary node; and
establishing a point of consistency within the database between the new primary node and remaining secondary nodes as a new current state of the database.

19. The system of claim 18, wherein establishing one of the plurality of secondary nodes as a new primary node having the primary node role comprises:
electing automatically, in response to a detected failure of the primary node, a new primary node from the plurality of secondary nodes; and
establishing for the new primary node at least one secondary node to replicate operations.

20. The system of claim 11, wherein replicating, from the primary node, an executed database access operation to secondary nodes associated with the primary node includes committing the executed database access operation in response to an acknowledgement of the executed database access operation from a threshold number of nodes responsible for related data.

* * * * *